US005377166A

United States Patent [19]

Kuhn

[11] Patent Number: 5,377,166

[45] Date of Patent: Dec. 27, 1994

[54] POLYHEDRAL DIRECTIONAL TRANSDUCER ARRAY

[75] Inventor: Philip M. Kuhn, Severna Park, Md.

[73] Assignee: Martin Marietta Corporation, Bethesda, Md.

[21] Appl. No.: 186,392

[22] Filed: Jan. 25, 1994

[51] Int. Cl.[5] .................... G01S 15/00

[52] U.S. Cl. .................... 367/138; 367/135

[58] Field of Search .................... 367/129, 153, 138, 123, 367/135; 181/144; 73/647

[56] References Cited

U.S. PATENT DOCUMENTS

| | | | |
|---|---|---|---|
| 3,593,818 | 7/1971 | Pohlmann | 73/647 |
| 5,239,518 | 8/1993 | Kazmar | 367/157 |
| 5,258,771 | 11/1993 | Praba | 343/895 |

OTHER PUBLICATIONS

Ring et al., 1986 Volumetric Array Nicrad Final Report, prepared for Naval Underwater Systems Center, New London, Conn., Contract NICRAD-85-NUS-C-022.

Jarzynski et al., Array Shading for a broadband constant directivity transducer, J. Acoust. Soc. Am. 64(5), Nov. 1978, pp. 1266-1269.

Brick, Discussion of transmitting directivity index for volumetric arrays, J. Acoust. Soc. Am. 92(1), Jul. 1992, pp. 585-588.

*Primary Examiner*—Daniel T. Pihulic

*Attorney, Agent, or Firm*—Gay Chin; Stephen A. Young; William H. Meise

[57] ABSTRACT

Each of the acoustic transducers (elements) of an array has a maximum dimension of less than λ. They are located at the vertices of a regular polyhedron, which may be an icosahedron (12 elements), or a dodecahedron (20 elements). This placement effectively locates the elements on the surface of a sphere with diameter selected to provide an interelement spacing of λ/3 to 2λ/3. The signals are delayed for phasing to form directive "beams." A second array includes elements located at the vertices of a smaller polyhedron centered at the same point and included within the first array, and operated at a higher frequency than the outermost array. In order to reduce the effects of shadowing, the locations of the transducers of the smaller included array are selected to lie on radials passing through the centroids of the faces of the polygon defining the larger array.

9 Claims, 25 Drawing Sheets

POLYHEDRAL DIRECTIONAL TRANSDUCER ARRAY

FIELD OF THE INVENTION

This invention relates to transducer arrays, and more particularly to polyhedral arrays of acoustic transducers such as those used for sonar and underwater detection, location or monitoring.

BACKGROUND OF THE INVENTION

Acoustic transducers are used for transducing acoustic (sound) energy with electrical energy. This may be useful, for example, for producing sound in response to electrical signals, as in a loudspeaker, or for producing electrical signals in response to sound energy, as in a microphone. In this context, the term sound also means ultrasound. The design of an acoustic transducer is strongly impacted by the fluid medium for which it is intended, and whether it is intended for producing sound energy in the medium, or extracting energy therefrom. When electrical energy is applied to the acoustic transducer for coupling to the fluid medium, the transducer must be strongly coupled to the fluid, otherwise the electrical energy will not be transferred to the fluid (will be reflected to or remain in the electrical source), or will be absorbed in the transducer itself, thereby causing heating. Strong coupling to the medium generally means a relatively large aperture, so that significant amounts of the fluid may be moved in response to the electrical energy, and the structure must be sufficiently large to handle the heat energy and forces involved in the transduction. Acoustic transducers intended for sensing or picking up sounds, on the other hand, may be small, as they are unlikely to absorb so much energy from the medium that they heat up, and the relatively small electrical signals which are produced can generally be amplified to useful levels. A further advantage of physically small transducers is that they tend to have relatively good frequency response, by comparison with larger transducers, because their mechanical resonances occur at higher frequencies than those of larger transducers, and they therefore have a broader frequency range over which the amplitude response of the transducer is flat.

Transducers for underwater purposes such as sonar are often operated in both a transmission mode, and, at a different time, in a reception mode. The requirements of the transmission mode tend to dominate the design of such transducers. U.S. Pat. No. 5,239,518, issued Aug. 24, 1993 in the name of Kazmar, describes one such sonar transducer, therein termed a "projector." The Kazmar transducer includes an electrostrictive or piezoelectric material, which responds to electrical signals to produce corresponding acoustic signals, and which also transduces in the other direction, producing electrical signals in response to acoustic energy.

The velocity of sound signals depends upon the density of the medium; the velocity of sound in air is about 1100 ft/sec., in water about 4800 ft/sec., and in steel about 16000 ft/sec. Since the wavelength in a medium at a given frequency is directly related to the velocity of propagation, the wavelength in water at any given frequency is much larger than in air. Consequently, a given structure is smaller, in terms of wavelengths, in water than in air. Therefore, structures such as acoustic transducers tend to be relatively small in terms of wavelength when immersed in their fluid medium, water. A concomitant of small size in terms of wavelength is isotropy or nondirectionality of the response; a transducer which is very small in terms of wavelengths effectively appears to be a point source, and transduces in a nondirectional or omnidirectional manner.

Directional transduction is desirable for many reasons. For example, when using a transducer to listen to distant sound sources, a directional "beam" tends to reduce the influence of noise originating from other directions. When transmitting acoustic energy toward the location of an object to be detected by observation of the acoustic reflection, a directional transmission "beam" concentrates the available energy toward the object, making it more likely that sufficient energy strikes the object that its reflection can be detected. However, as mentioned, an acoustic transducer tends to be small in terms of wavelength, and to provide omnidirectional transduction.

A well-known method for increasing acoustic directionality is to arrange a plurality of individual transducers in an array. For example, long "line" arrays of acoustic transducers may be spaced along a cable, and towed behind a ship performing undersea examination. The acoustic transducers are energized simultaneously in a transmit mode, so that they act in concert, with the result that the effective dimension of the transmitting transducer is established by the length of the cable, rather than the dimension of an individual transducer. This enables a directional beam to be produced, which in the case of the described towed array is a "fan" beam orthogonal to the cable's length. The same towed array, operated as a receive transducer, combines all of the received signals without relative delays or phase shifts, and achieves a "receive beam" corresponding to the abovementioned fan beam.

Other types of arrays are known. An April, 1987 report prepared for Naval Underwater Systems Center, New London, Conn., under contract NICRAD-85-NUSC-022 describes an array of twenty-one transducers in the form of a right circular cylinder, which is advantageous because of its symmetry in the horizontal plane, and the resulting 360-degree azimuth coverage. The diameter and height of the described cylindrical array are about one wavelength. The elements were driven with relative time delays for phasing to a plane.

Improved array configurations are desirable.

SUMMARY OF THE INVENTION

A transducer array according to the invention includes a plurality of acoustic transducers for use in a fluid medium. Each of the transducers has a maximum dimension of less than one acoustic wavelength in the medium. The acoustic transducers are arrayed with their acoustic centers at the vertices of a regular polyhedron defining vertices and more than six sides. In one embodiment of the invention, the polyhedron is an icosahedron, and the number of transducers or array elements is twelve. In another embodiment, the polyhedron is a dodecahedron, and there are twenty transducers. Placement at the vertices of a regular polyhedron effectively places the elements of the array in a regular manner on the surface of a sphere, with the inter-element spacing not necessarily equidistant. The transducers are physically arrayed by a support structure, and electrically arrayed by at least one of a transmitter or drive arrangement, which may be associated with the array as a whole, or with individual units for each transducer, for generating electrical analogues of the desired acoustic signal, and by a receiver for receiving transduced signals from the transducers. Such a structure, because of its uniformity in three dimensions, can provide a particularly uniform omnidirectional or isotropic response, at least over a limited frequency range. A particularly desirable arrangement includes delays for phasing the signals to form transmission or reception "beams" having directivity. Arrays with a diameter providing an interelement spacing of about one-third to two-thirds of a wavelength have been found to provide good characteristics over an octave frequency bandwidth. Such a sphere diameter for an icosahedron is about 1.903 times the interelement spacing. According to a further aspect of the invention, a second array is associated with the first array, with the elements of the second array being located at the vertices of another polyhedron different from the first polyhedron, with both polyhedra centered at the same location. In one embodiment, the first array includes elements located on at least some, and preferably all, of the twelve vertices of an icosahedron, and the second array includes elements located on at least some, and preferably all, of the twenty vertices of a dodecahedron. The dodecahedron's twenty vertices are coradial (lie on the same radial) with the centroids of the twenty faces of the icosahedron. In other words, each of the vertices of the dodecahedron lies on one of the radials which passes through the centroid of one of the twenty faces of the icosahedron. The interelement spacing along the perimeter chords of the pentagonal face of the dodecahedron is (approximately) 50% of the interelement spacing along one chord of the isosceles triangular face of the icosahedron. The second array is provided with its own transmitter(s) andor receiver, and controlled delays, if desired, for creating a directional beam, which may be coincident with the icosahedral array beam.

Figure 1:
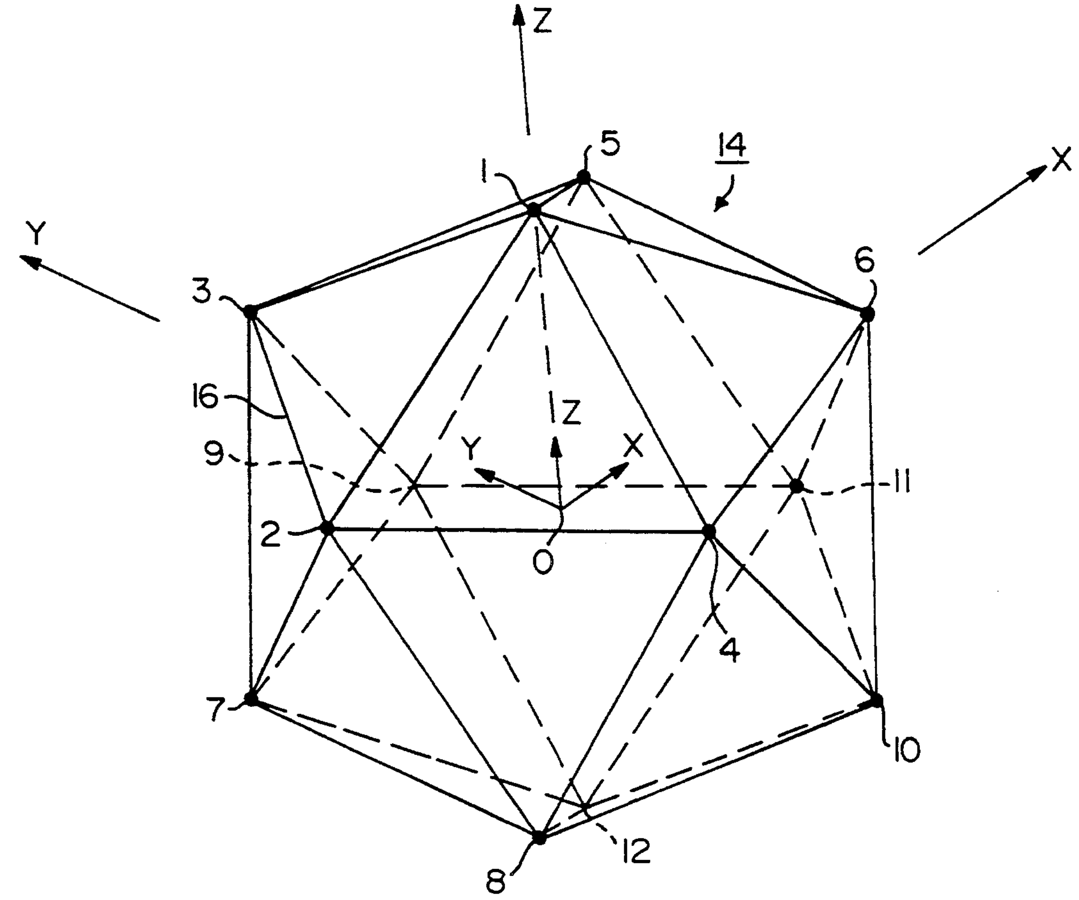
FIG. 1 is a perspective or isometric view of a geometric solid icosahedron.
Figure 3:
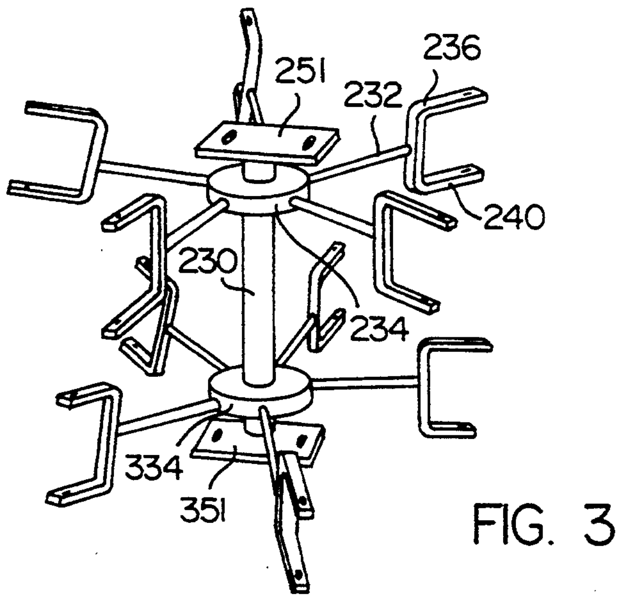
Figure 4:
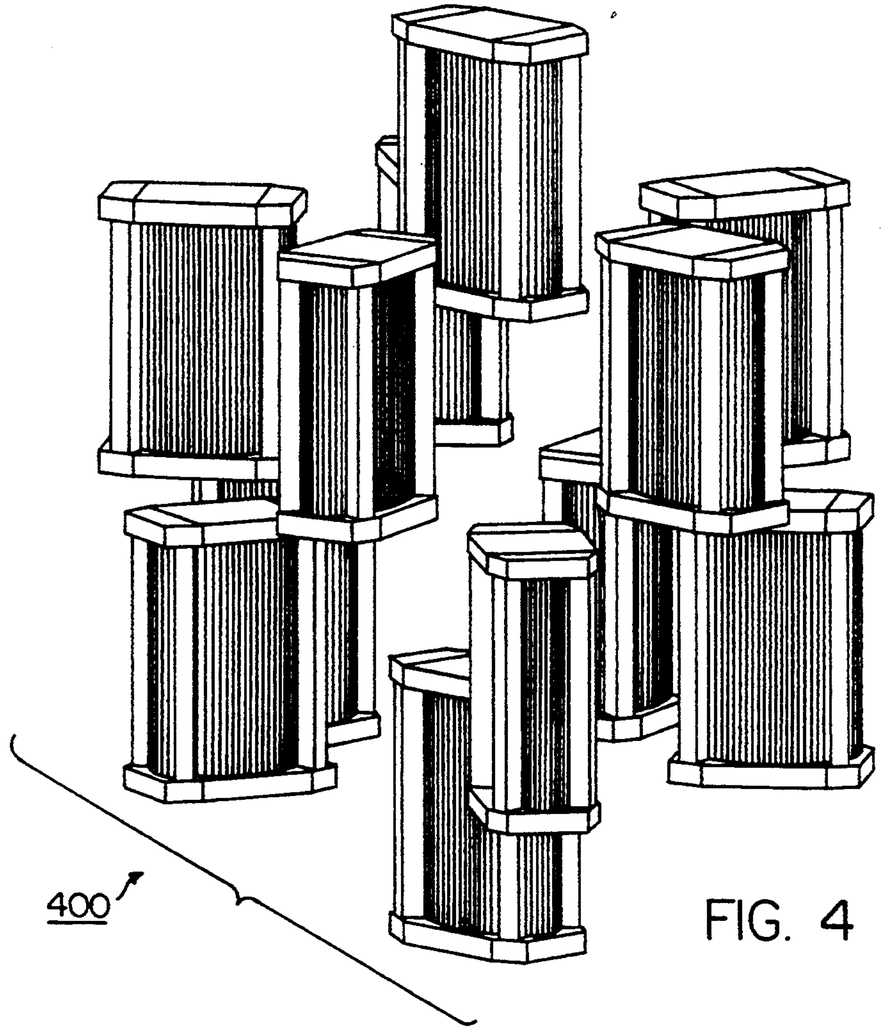
Figure 5:
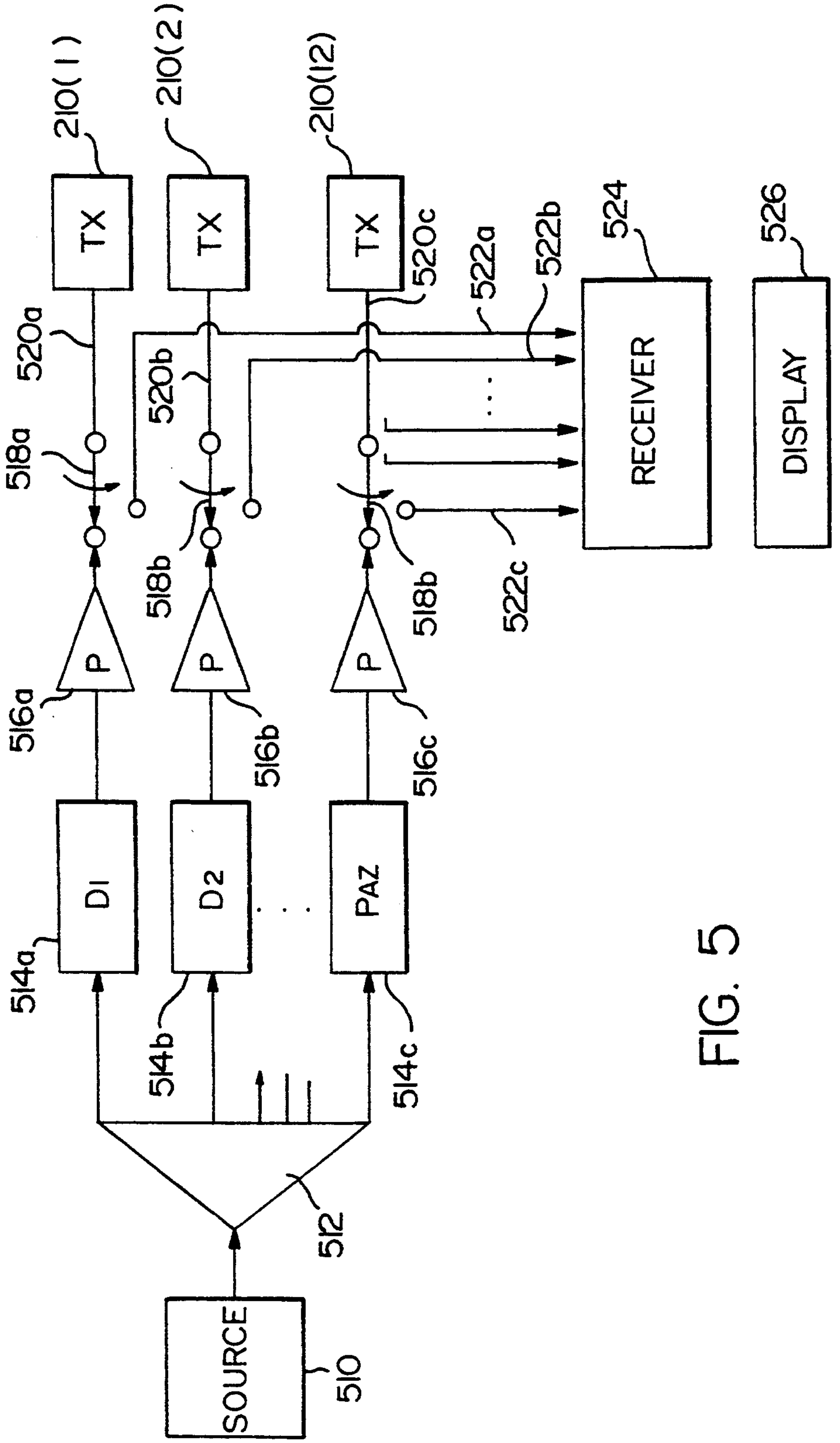
Figure 10A:
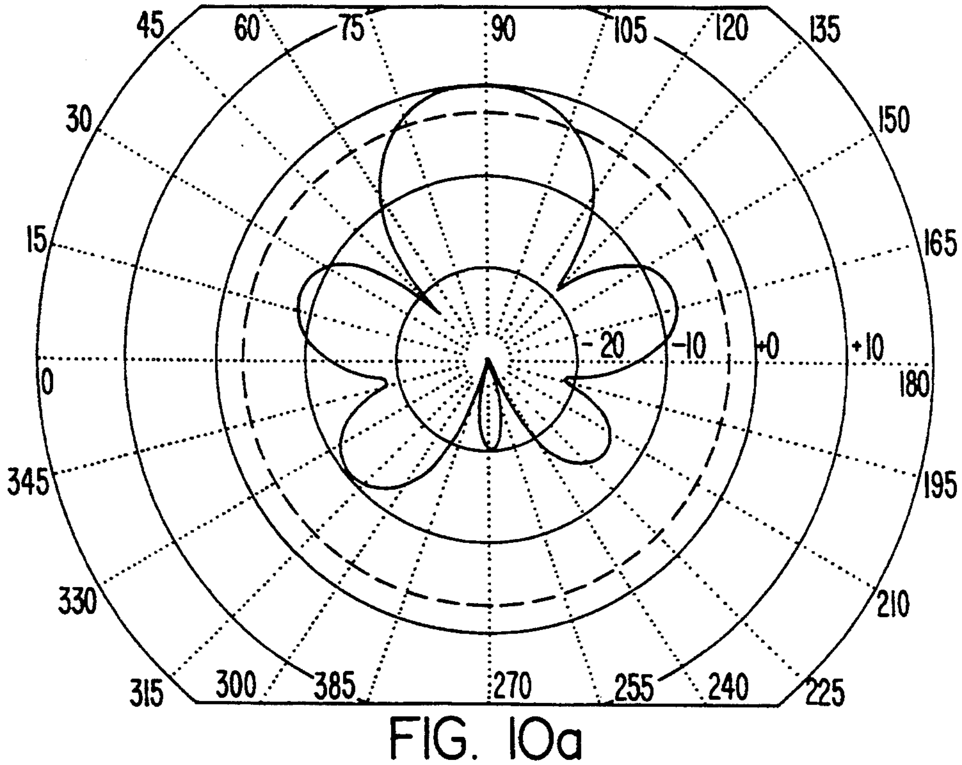
Figure 10B:
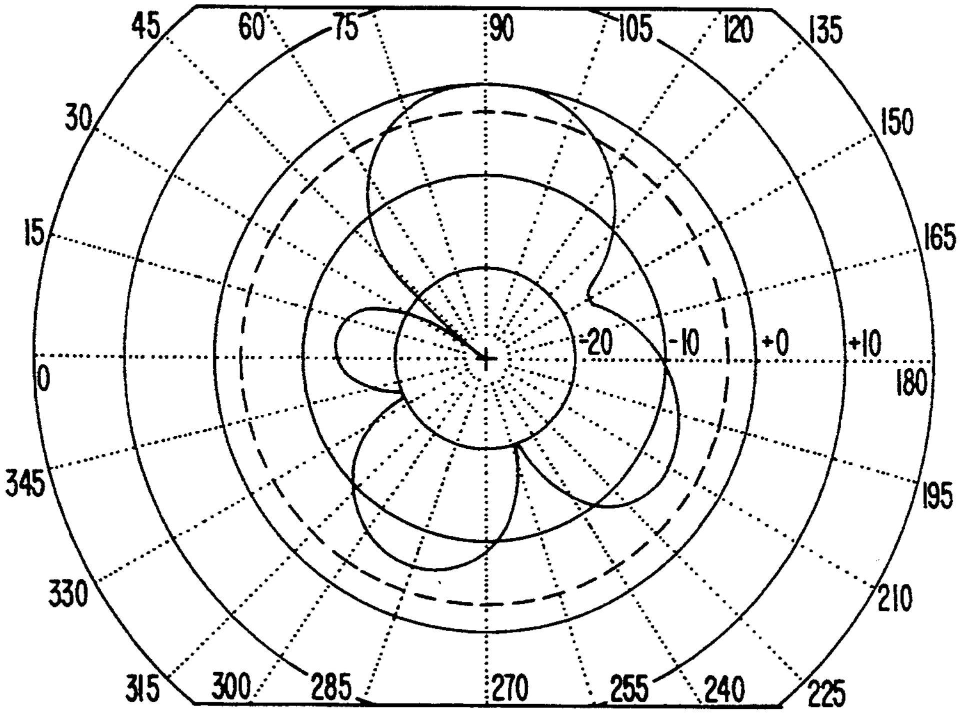

FIG. *2a* is a simplified perspective or isometric view of an acoustic transducer, and FIG. *2b* is a side elevation view of two such transducers and a portion of a support structure which supports the transducers at the vertices of the icosahedron of FIG. 1;

FIG. 3 is a simplified perspective or isometric view of the support structure for an icosahedral array;

FIG. 4 represents the transducers located by the support structure of FIG. 3;

FIG. 5 is a simplified block diagram of an array, showing transmitter and receiver;

FIG. *6a* represents an icosahedron with twenty faces, and the vertices of a smaller included concentric dodecahedron located on radials extending from the center through the centroids of the faces of the icosahedron, and FIG. *6b* represents an icosahedral array with an included dodecahedral array;

FIG. *7a* is a plot illustrating considerations which relate wavefront delays and propagation direction of a directional beam from an array, FIG. *7b* is an illustration of a three-dimensional coordinate system for enhanced understanding of radiation plots;

FIGS. *8a–8i* are plots of the response of an array of FIG. *6a*, in a vertical plane passing through $\phi_S$, at different frequencies, and FIGS. *9a–9i* are plots of the response of the same array at the same frequencies, but in a horizontal plane; and FIG. 10*a* is a plot of the response of an inner array of a pair of nested arrays as in FIG. *6b*, and FIG. 10*b* is a plot of the response of the outer array.

DESCRIPTION OF THE INVENTION

FIG. 1 illustrates a conceptual geometric solid icosahedron 14, including twelve vertices designated by numerals 1–12, where the hyphen represents the word "through." The illustrated vertices of the icosahedron in one embodiment of the invention are located at X, Y and Z coordinates, measured in inches, as listed in Table I:

TABLE I

| VERTEX | X | Y | Z |
|---|---|---|---|
| 1 | 0 | 0 | 5.654 |
| 2 | −5.057 | 0 | 2.529 |
| 3 | −1.563 | 4.810 | 2.529 |
| 4 | −1.563 | −4.810 | 2.529 |
| 5 | 4.091 | 2.973 | 2.529 |
| 6 | 4.091 | −2.973 | 2.529 |
| 7 | −4.091 | 2.973 | −2.529 |
| 8 | −4.091 | −2.973 | −2.529 |
| 9 | 1.563 | 4.810 | −2.529 |
| 10 | 1.563 | −4.810 | −2.529 |
| 11 | 5.057 | 0 | −2.529 |
| 12 | 0 | 0 | −5.654 |

The vertices of icosahedron 14 together define twenty faces, each of which may be identified by the designations of the three vertices by which it is defined. The vertices of icosahedron 14 lie at equal radii from the origin of the coordinate system. According to an aspect of the invention, acoustic transducers are physically located with their acoustic centers at the vertices of the icosahedron 14. Each acoustic transducer may be of the magnetically actuated, piezoelectric, electrostrictive, or any other type, as known in the art. Placement of the transducers on the surface of a sphere allows the array to perform in an omnidirectional or isotropic manner, by comparison with line, flat or cylindrical arrays. In order to enhance omnidirectionality, each acoustic transducer is limited in size, with its maximum or largest dimension being limited to less than one wavelength of the medium at the highest frequency of interest. In a transmission mode, the highest frequency of interest corresponds to the highest transmitted frequency.

FIG. *2a* is a simplified perspective or isometric view of one form of acoustic transducer 210 which may be used in the array of FIG. 1. In FIG. *2a*, the transducer has flat, mutually parallel upper and lower faces 212 and 214, respectively, which are provided for support, and the active portions of the transducer occupy the oblate or elliptical right cylindrical body 216 lying between the upper and lower support faces. An axis 208 passes through acoustic center 206 of transducer 210. Axis 208 is parallel to the Z axis of FIG. 1. If axis 208 of FIG. *2a* were coincident with the Z axis of FIG. 1, transducer 210 of FIG. *2a* would thereby be identified as corresponding to the transducer located at either vertex 1 or 12 of FIG. 1. FIG. *2b* is a side elevation view of two acoustic transducers such as 210 of FIG. *2a*, namely transducers 210(1) and 210(4), where the parenthetical designation identifies the vertex of the polyhedron or array of FIG. 1 upon which the particular transducer is centered. FIG. *2b* also shows a central support shaft 230 extending parallel to or coincident with the Z axis of FIG. 1, and a support yoke 232 supported by a coupling ring 234 on central support shaft 230. Support yoke 232 includes an upper leg 236 fastened by a screw 238 to upper face 212 of transducer 210(4), and a lower leg 240 fastened by screws 242 and 244 to its lower face 214. A pair of electrodes 246*a* and 246*b* are provided for making electrical contact with the internal active portions of transducer 210(4). Also in FIG. 2*b*, transducer 210(1), which corresponds with the uppermost transducer in the array of FIG. 1, has its lower support plate 214 fastened to a plate 251 by screws 252 and 254, and is not supported at its upper plate 212. Transducer 210(1) of FIG. 2*b* is also provided with electrical contacts designated 256*a* and 256*b*.

Figure 2A:
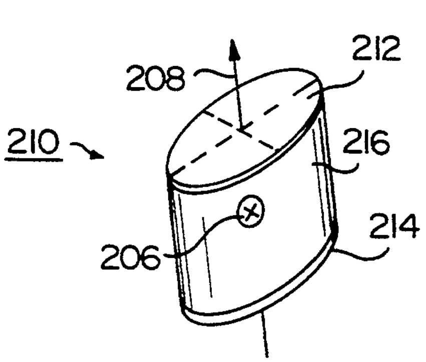
Figure 2B:
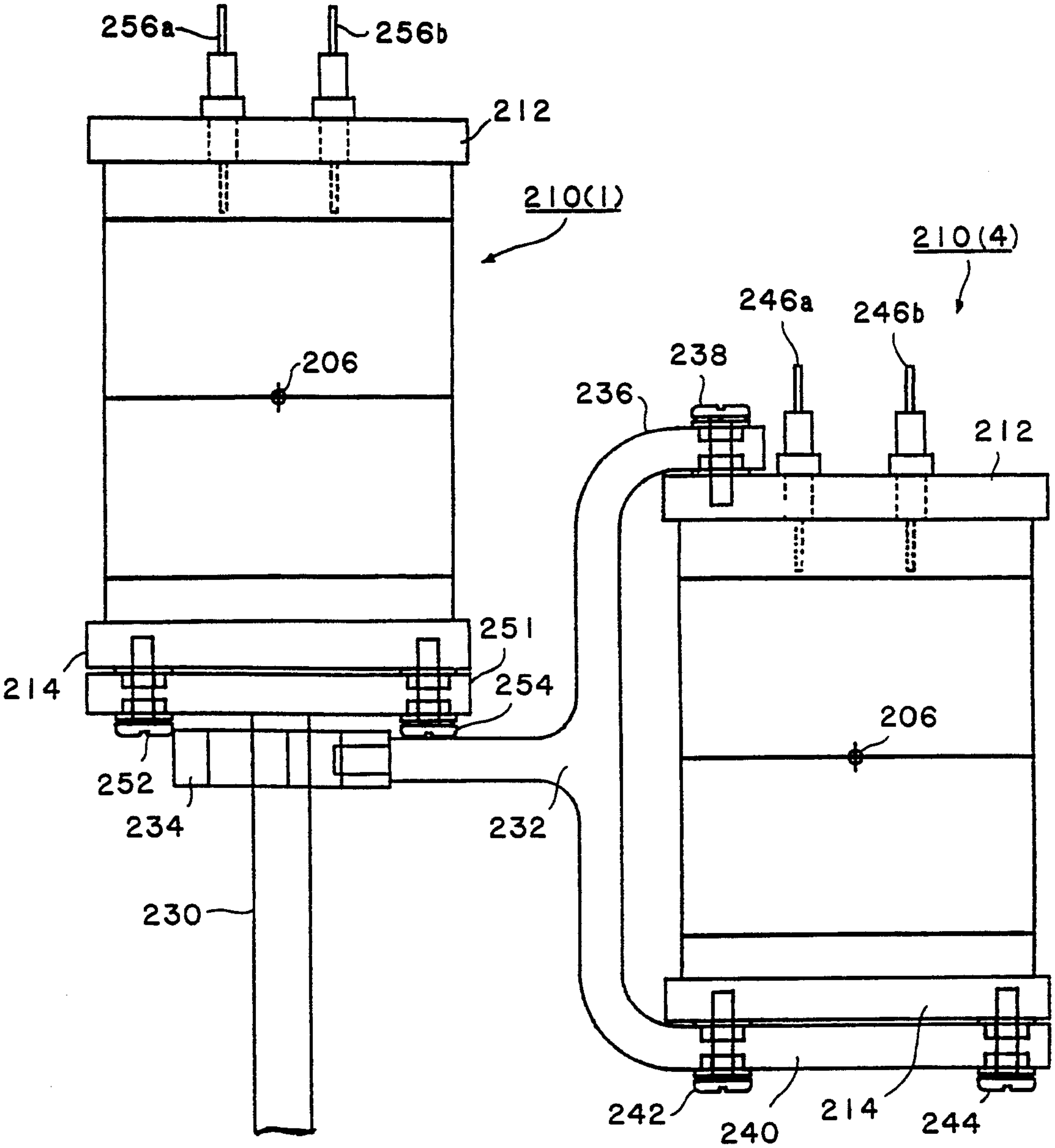

FIG. 3 is a perspective or isometric view of the entirety of the support structure of FIG. 2*b*. In FIG. 3, elements corresponding to those of FIG. 2*b* are designated by like reference numerals. In FIG. 3, support shaft 230 is seen to support a lower support ring 334 and a lower support plate 351 in addition to upper support ring 234 and upper support plate 251. Each support ring supports five yokes such as yoke 232, equally spaced at 72° increments. Support rings 234 and 334 are mutually offset by 36°, so that the acoustic centers of the transducers to be supported lie at the correct locations as identified by vertices 1–12 of the polyhedron of FIG. 1. FIG. 4 is a computer-generated representation of a complete set of transducers similar to those of FIGS. 2*a* and 2*b*, in the locations in which the support of FIG. 3 places them, and formed into an array 400.

Instead of the support of FIG. 3, the physical structure which supports the array of transducers may be a system of struts which parallels or coincides with the lines which extend from vertex to vertex to define the faces of the polyhedron, such as line 16, extending between vertices 2 and 3 of FIG. 1. A physical support structure such as that described in conjunction with FIG. 1 may be costly, in that it may require connections to each transducer from five different directions, and the structure of FIG. 3 is preferred.

FIG. 5 is a simplified block diagram of a transmitter and receiver system using the transducer array of FIG. 4. In FIG. 5, the transmitter includes a source of electrical signals at one or more frequencies, or at varying frequencies, which is coupled to a signal divider (also known as a power divider) 512, which divides the signal into twelve portions (for use with the icosahedral array), and which applies each of the signal portions to a controlled delay (D) element 514, namely delay elements 514*a*, 514*b* . . . , 514*c*, for delay of the signal in accordance with array constants and the desired beam pattern. The delayed signals from each delay element are applied to the input of a corresponding power amplifier 516. More specifically, the delayed output signal from delay element 514*a* is applied to amplifier 516*a* for amplification therein, the delayed output signal from delay element 514*b* is applied to amplifier 516*b* for amplification therein . . . , and the delayed output signal from delay element 514*c* is applied to amplifier 516*c* for amplification therein. The amplified signals from amplifiers 516 each are applied by way of one of switches 518, in the illustrated positions thereof, to one of transducers 210. Thus, the amplified output from amplifier 516*a* is applied by way of switch 518*a* to transducer 210(1), the amplified output from amplifier 516*b* is applied by way of switch 518*b* to transducer 210(2), . . . , and the amplified output from amplifier 516*c* is applied by way of switch 518*c* to transducer 210(12). When source 510 of FIG. 5 is energized with switches 518 in their illustrated positions, amplified, selectively delayed electrical signals are applied to the transducers, and acoustic signals are radiated into the medium in a direction, and with sidelobe characteristics, established by the array dimensions, the velocity of propagation in the fluid medium, and the relative delays.

In an actual embodiment of the array used for experimental purposes, source 510 of FIG. 5 was a personal computer producing digital equivalents of sinusoidal signals, and the power divider 512/delay 514 combination was provided by a multichannel digital-to-analog converter (DAC) arrangement.

For reception of signals by transducers 210 of FIG. 5, switches 518 are thrown to their alternate positions, not illustrated in FIG. 5, thereby decoupling each transducer 210 from its associated power amplifier 516, and coupling the transducer instead to a receiver illustrated as a block 524. Block 524 may include delays corresponding to delays 514, with corresponding delay values or with different delay values, for forming a receive beam as generally known in the art. The receiver may also process the signals for extracting information therefrom, as for example determining the delay time between transmission of a signal and its reflection, for determining the distance to the reflecting object or medium condition.

Figure 6A:
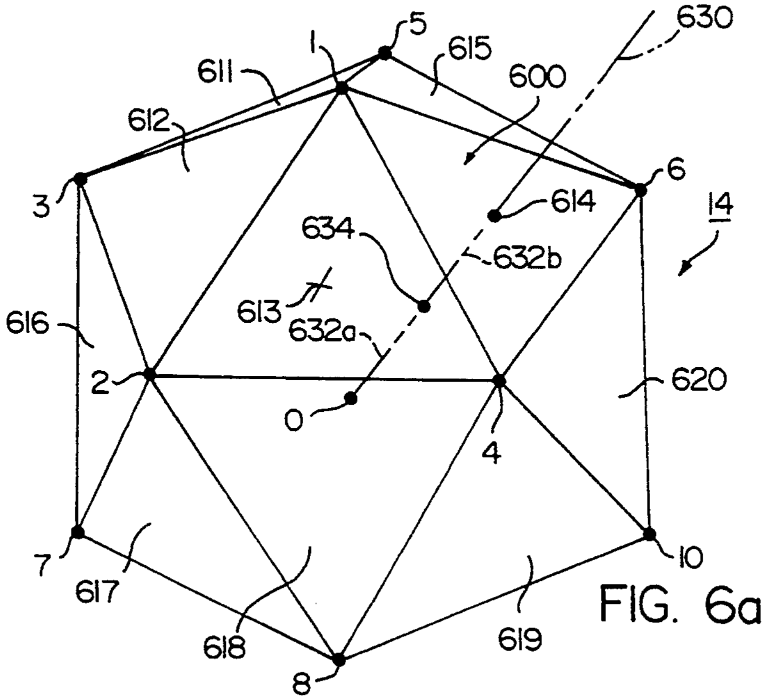

FIG. 6*a* is a perspective or isometric view similar to FIG. 1, illustrating vertices 1–12 of icosahedron 14, with connecting lines to provide dimensional cues. As mentioned, an icosahedron has twelve vertices defining twenty faces, not all of which are visible in FIG. 6*a*. A dodecahedron has twenty vertices defining twelve faces. In FIG. 6*a*, icosahedron 14 of FIG. 1 is centered on the origin O of the coordinate system, and includes a smaller dodecahedron designated generally as 600, also centered on the origin O of the coordinate system, none of which is visible.

As an aid in visualizing the position of the included dodecahedron, the centroids of the faces of the icosahedron are illustrated in FIG. 6*a*. More specifically, using the face identification convention previously stated, point 611 represents a centroid of face 1,3,5 of icosahedron 14; a second point 612 represents the centroid of face 1,2,3 of icosahedron 14; a third point 613 represents the centroid of face 1,2,4; a fourth point 614 represents the centroid of face 1,4,6; a fifth point 615 represents the centroid of face 1,5,6; a sixth point 616 represents the centroid of face 2,3,7; a seventh point 617 represents the centroid of face 2,7,8; an eighth point 618 represents the centroid of face 2,4,8; a ninth point 619 represents the centroid of face 4,8,10; and a tenth visible point 620 represents the centroid of face 4,6,10 of icosahedron 14. Other centroids lie in other faces of icosahedron 14 which are not visible in FIG. 6*a*. In FIG. 6*a*, a line 630 represents a radius extending from the origin O of the coordinate system through centroid 614 of face 1,4,6. Corresponding radii may be considered to extend from origin O through each of the other centroids of the faces of icosahedron 14, but are not illustrated to avoid complicating FIG. 6*a*. That portion of radius 630 lying within icosahedron 14, namely that portion of line 630 extending from origin O to centroid 614, may be considered to be divided at a point 614 into two portions 632*a* and 632*b*. The lengths of line portions 632*a* and 632*b* may be equal. Dividing point 634 is the location of one of the twenty vertices of the included dodecahedron 600. Similarly, each of the corresponding points on each of the twenty other radii (not illustrated) which extend from origin O to the centroids 611–613 and 615–620 of the other faces of icosahedron 14 is the location of one of the twenty other vertices of included dodecahedron 600. Thus, the included dodecahedron has a diameter of about half of that of the icosahedron.

According to an aspect of the invention, a second array of transducers, similar to array 400 of FIG. 4 except for the number of transducers arrayed, has its elements located at the vertices of dodecahedron 600 of FIG. 6*a*, interspersed among the elements of the icosahedral array 400 of transducer elements. Since the second array coincides with the vertices of dodecahedron 600 of FIG. 6*a*, the second array is designated 600A of FIG. 6*b*. Each transducer of second array in transducers 600A is connected with other elements thereof, and with a source, controllable delays, amplifiers, switches, receivers similar to those described in conjunction with FIG. 5, the sole difference being the frequency or the frequency range of the second source. Thus, an icosahedral array, associated with its own transmitter and receiver, can occupy the same volume as a dodecahedral array, operating at a different frequency range and associated with at least a different receiver.

It should be noted that a computer model was made of a pair of nested icosahedral arrays similar to that described above, but with the transducers of both icosahedral arrays on the same radial. The model indicated that shadowing of the transducers of one array was produced by the transducers of the other array, and the results were inferior to the results using the nested icosahedral-dodecahedral arrays.

Figure 6B:
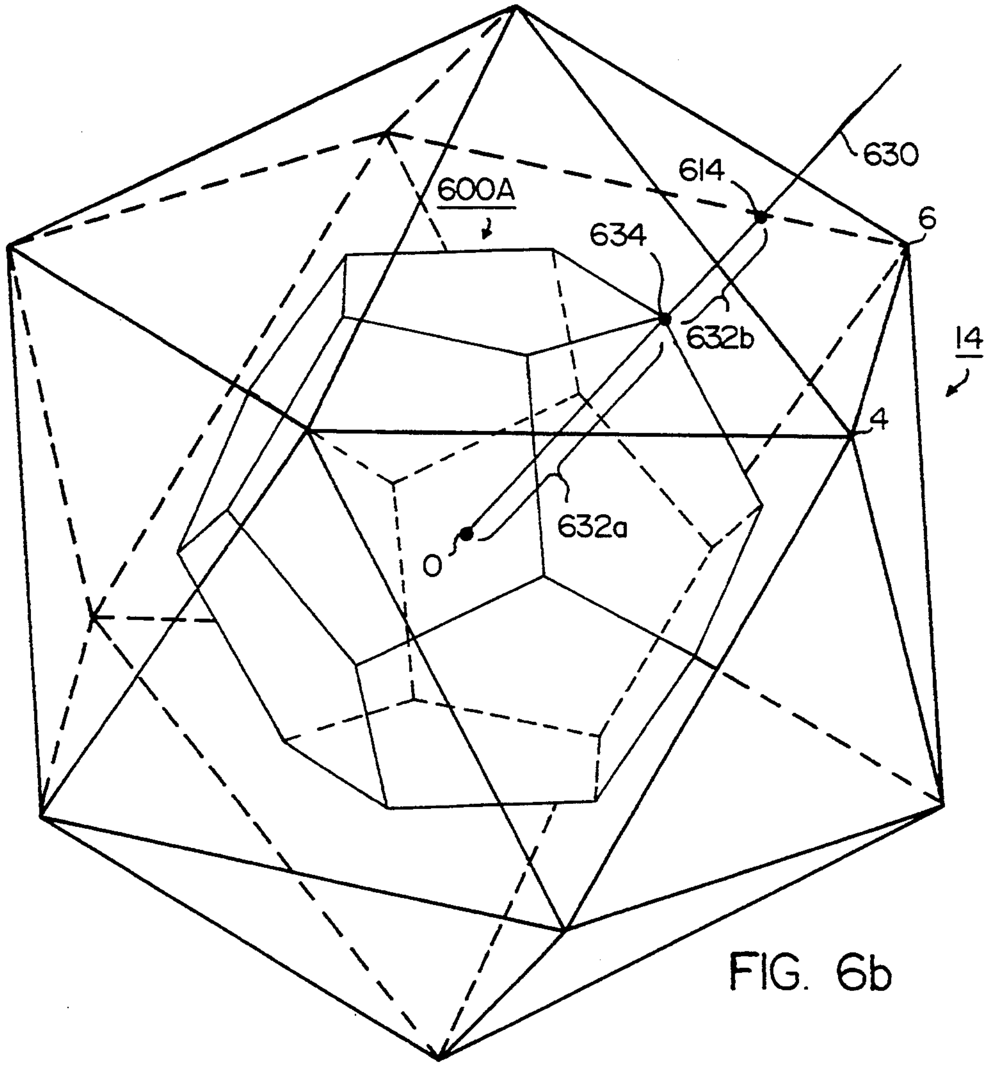

Dodecahedral array 600A, located inside the icosahedral array of FIG. 6*b*, has twenty transducer elements, instead of twelve. The dodecahedral array is made with transducer elements (not illustrated) which are smaller than the transducer elements, illustrated in FIG. 4, of the icosahedral array. Since each transducer element of the dodecahedral array is smaller than a transducer element of the icosahedral array, its effective aperture is smaller. When operated at a higher frequency than the transducers of the icosahedral array, the transducers of the dodecahedral array have roughly the same dimensions in wavelengths, so they also tend to be omnidirectional. However, the smaller physical dimensions of the transducers of the dodecahedral array relative to the transducers of the icosahedral array means that the smaller transducers can accept less electrical energization power before cavitation effects begin to occur in a water medium. Thus, the peak output power of a transducer of the dodecahedral array is more limited than the peak output power of a transducer of the icosahedral array. The peak acoustic power which the dodecahedral array can transmit, however, is about equal to that of the icosahedral array, because the dodecahedral array has twenty transducers, while the icosahedral array has only twelve transducers.

In a preferred embodiment of the invention, the icosahedral array covers an octave range, while the included dodecahedral array covers the next higher adjacent octave, thereby providing a two-octave range. In the middle of its octave range, the inter-element spacing of each array is about $\lambda/2$, but good operation occurs in the range of about $\lambda/3$ to $\lambda/3$.

Figure 7A:
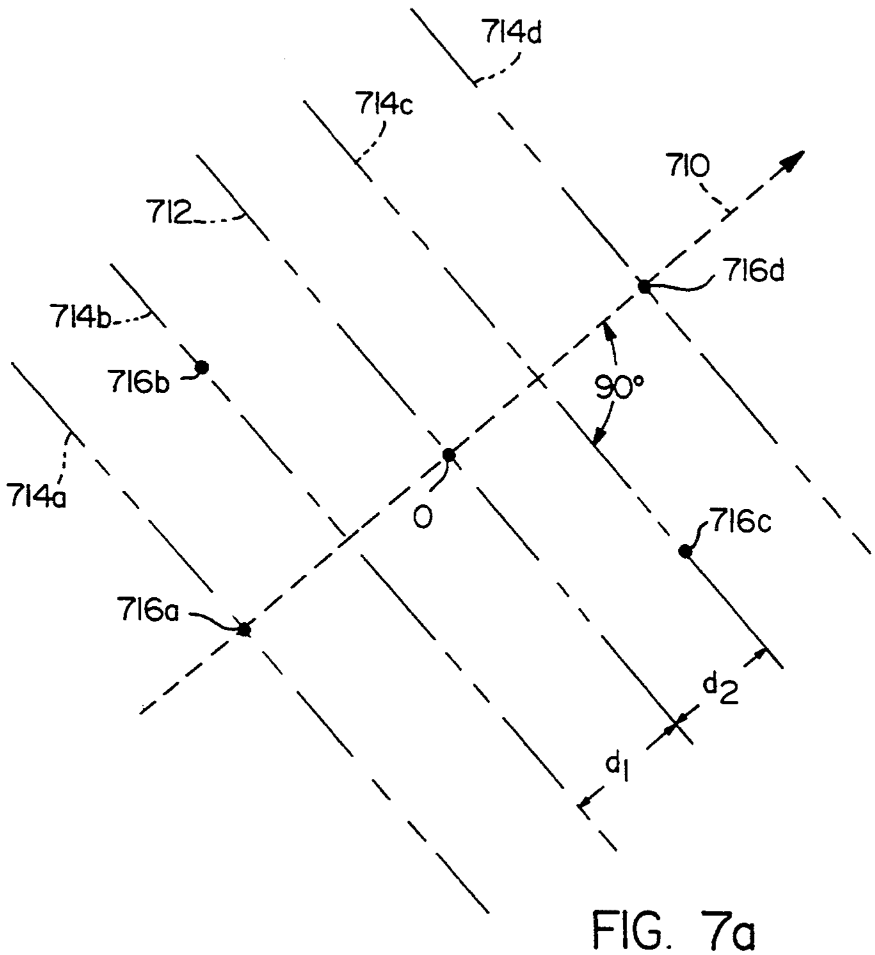

One of the advantages of the polygonal array according to the invention is that the beam can be steered in three dimensions. FIG. 7*a* illustrates considerations determining the amount of delay required in the delays 514 of FIG. 5 to steer the beam in a given direction. In FIG. 7*a*, the center of the array is O, and dotted line 710 illustrates the desired beam direction. A number of straight lines 712 and 714*a*, 714*b*, 714*c*, 714*d*, are drawn perpendicular (90°) to line 710, with line 712 passing through the center O of the array, and with each line 714 passing through the projection, into the plane of the FIGURE, of the location of the acoustic center of one of the transducers of the array. Each line 714 may be viewed as representing a plane wavefront propagating in the direction of line 710, and line 712 may be viewed as a reference wavefront occurring at a reference time. In FIG. 7*a*, points 716*a*, 716*b*, 716*c*, and 716*d* represent the projections into the plane of the FIGURE of some of the transducers of the array. Points 716*a*, 716*b*, 716*c*, and 716*d* are associated with wavefronts 714*a*, 714*b*, 714*c*, and 714*d*, respectively. Also indicated in FIG. 7*a* are distances $d_1$ and $d_2$, which represent the distance between wavefront 716*b* and reference wavefront 712, and between wavefront 716*c* and reference wavefront 712, respectively. A corresponding distance exists between the projection of each transducer of the array and the reference wavefront. The value of this distance will, in general, be different for each wavefront so constructed. In order to cause propagation in the direction of line 710 of FIG. 7*a*, the timing of wavefronts 714*a* and 714*b* must be earlier than, or lead reference wavefront 712, while the timing of wavefronts 714*c* and 714*d* must be later or lagging. This timing difference, whether positive or negative, is generally termed a "delay." The magnitude of the time delay t associated with each wavefront relative to the reference wavefront is the physical distance or dimension ($d_1$ or $d_2$) therebetween, divided by C, the velocity of propagation of the acoustic energy in the fluid medium $$t=d/C$$

Figure 7B:
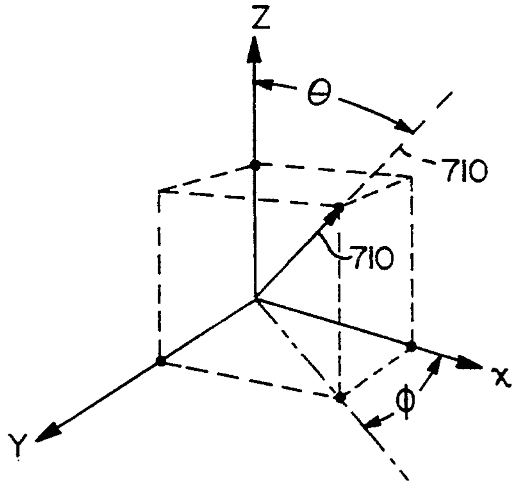
Figure 8A:
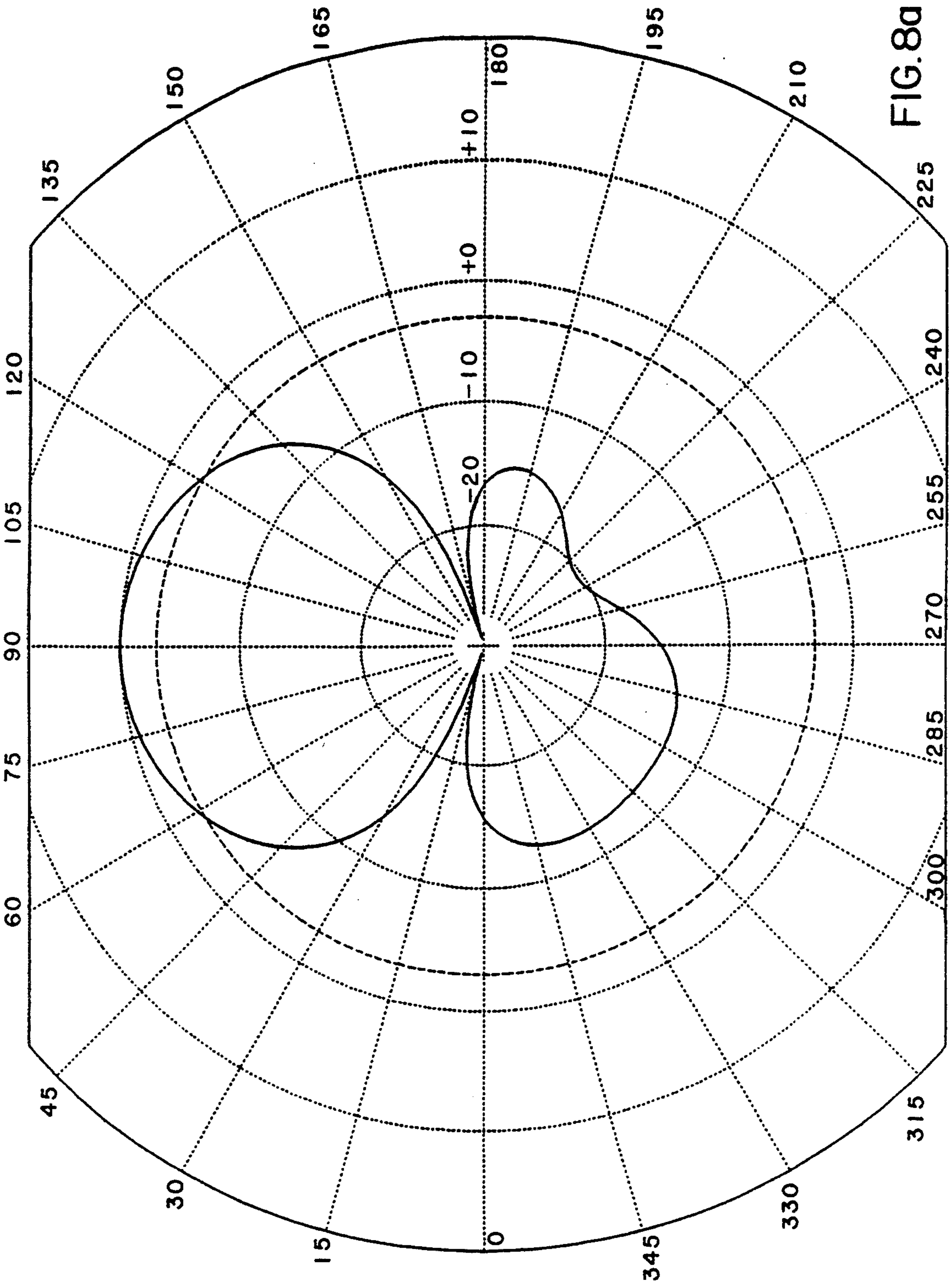
Figure 8B:
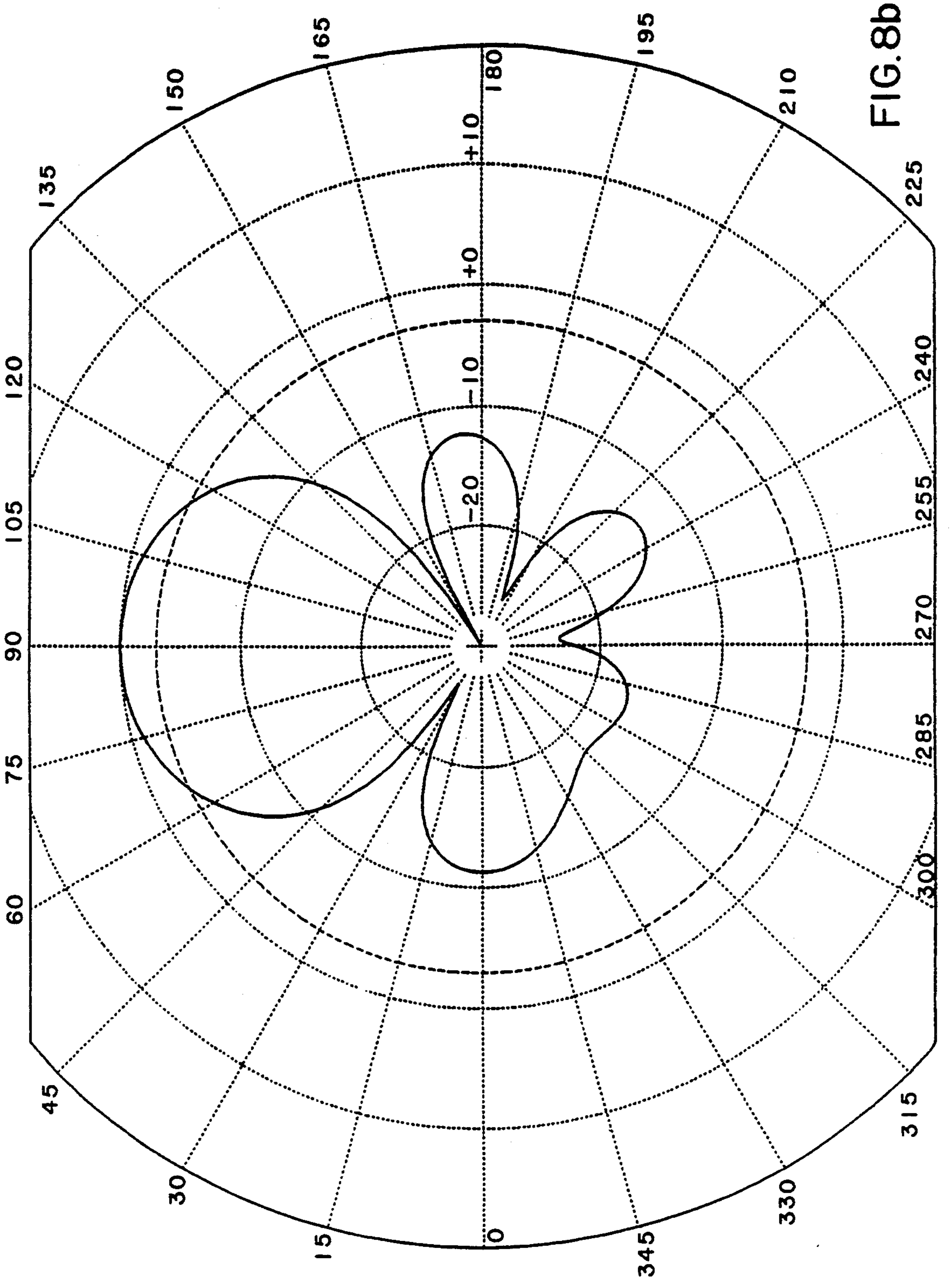
Figure 8C:
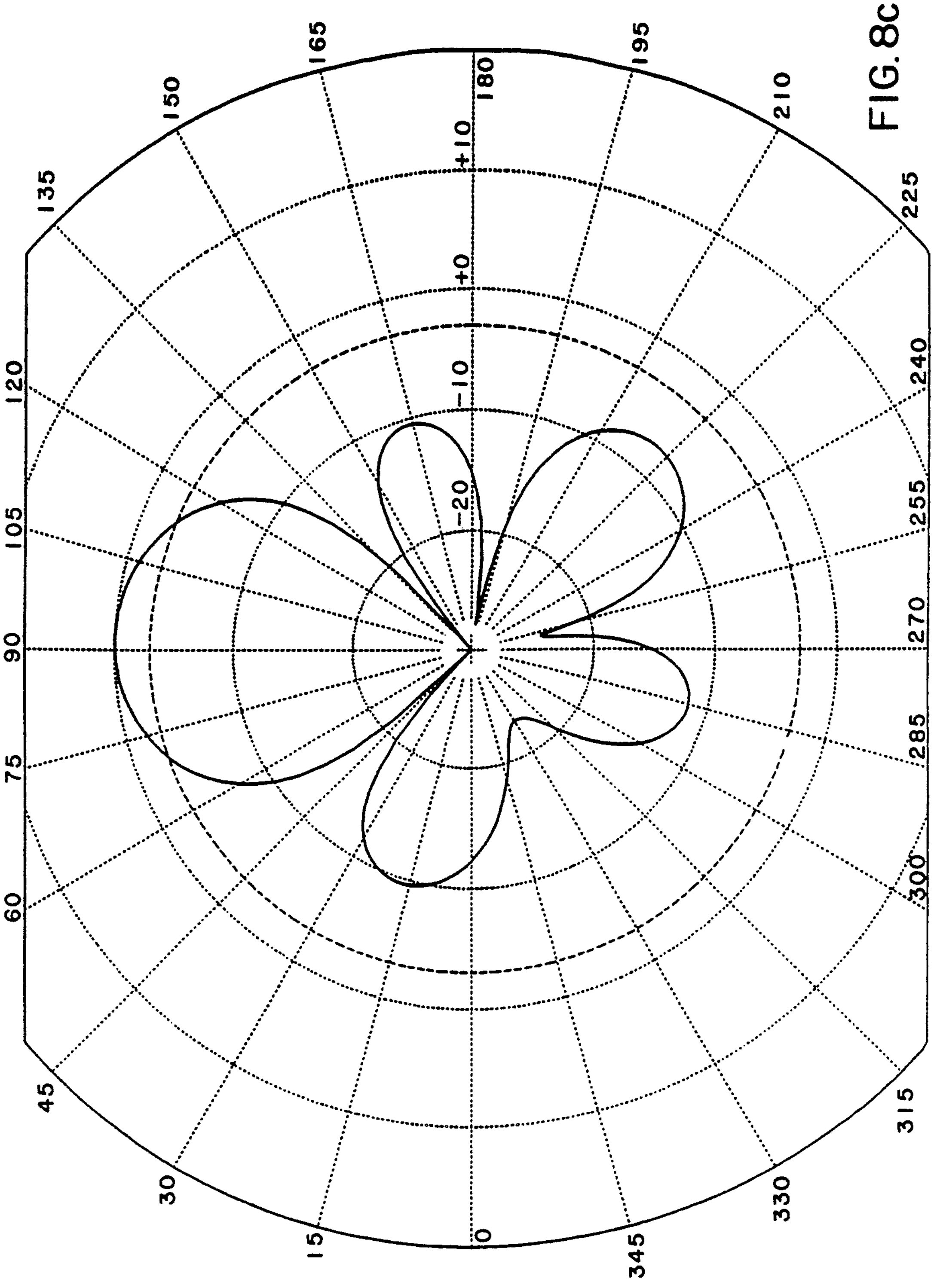
Figure 8D:
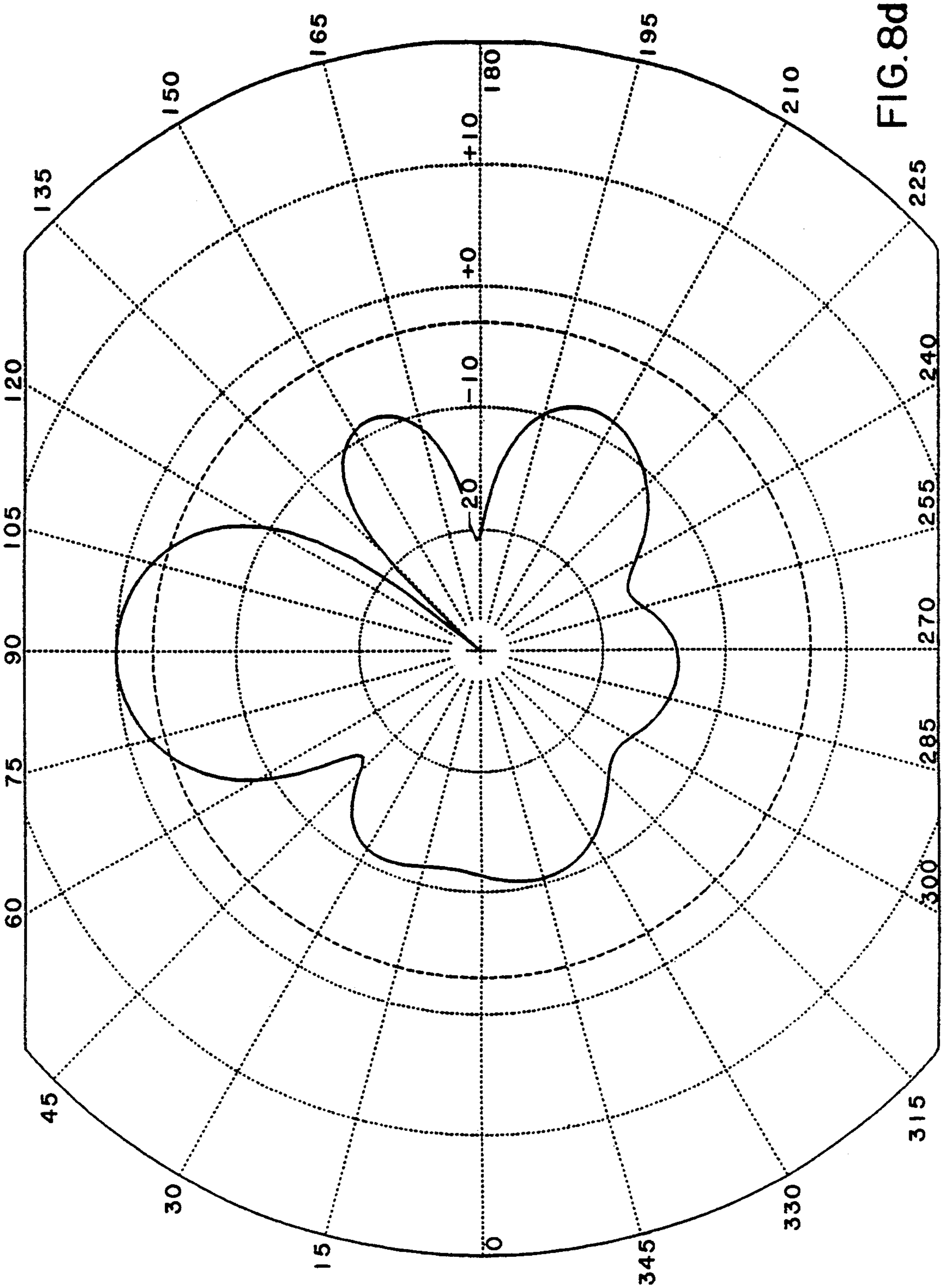
Figure 8E:
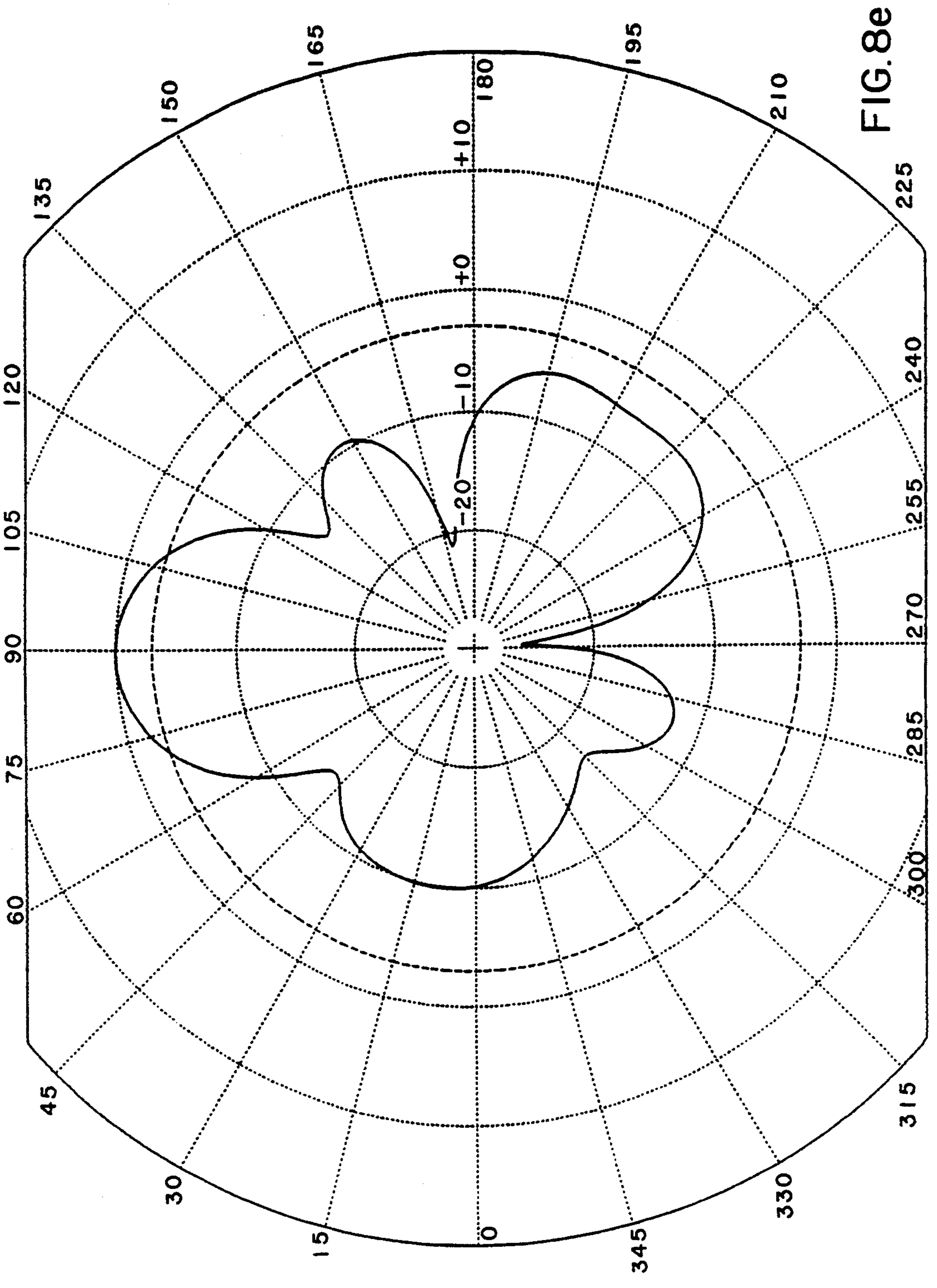
Figure 8F:
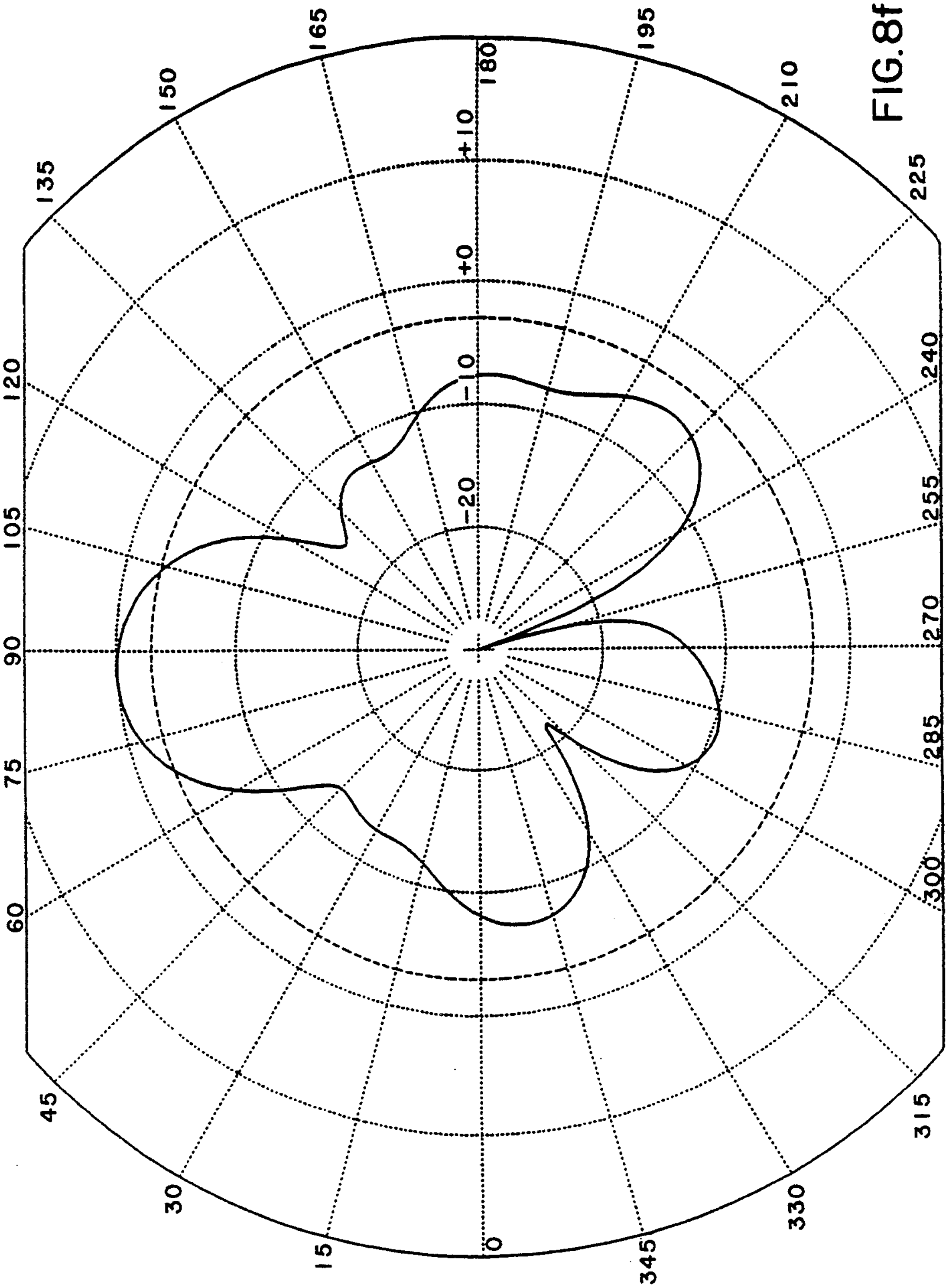
Figure 8G:
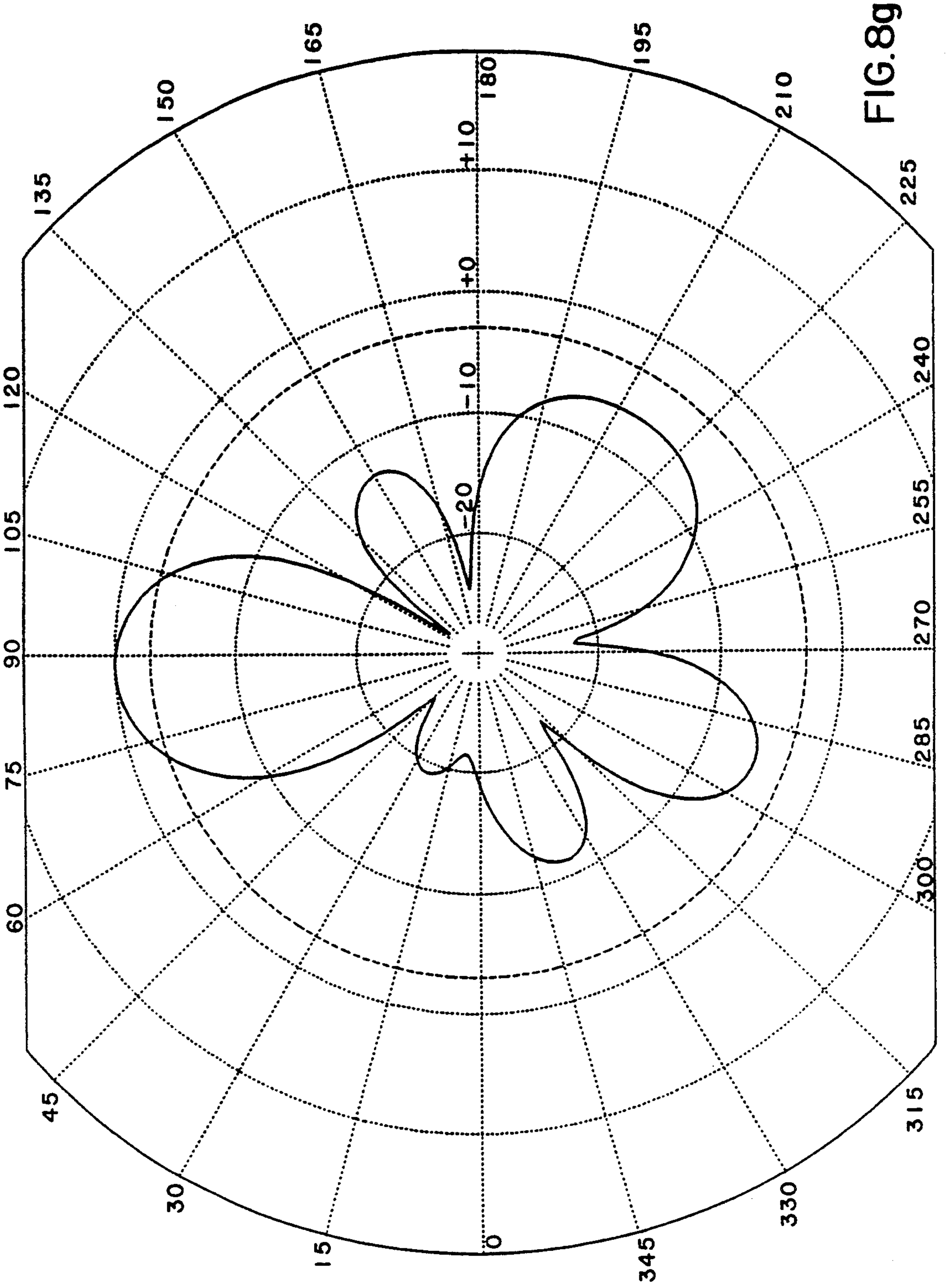
Figure 8H:
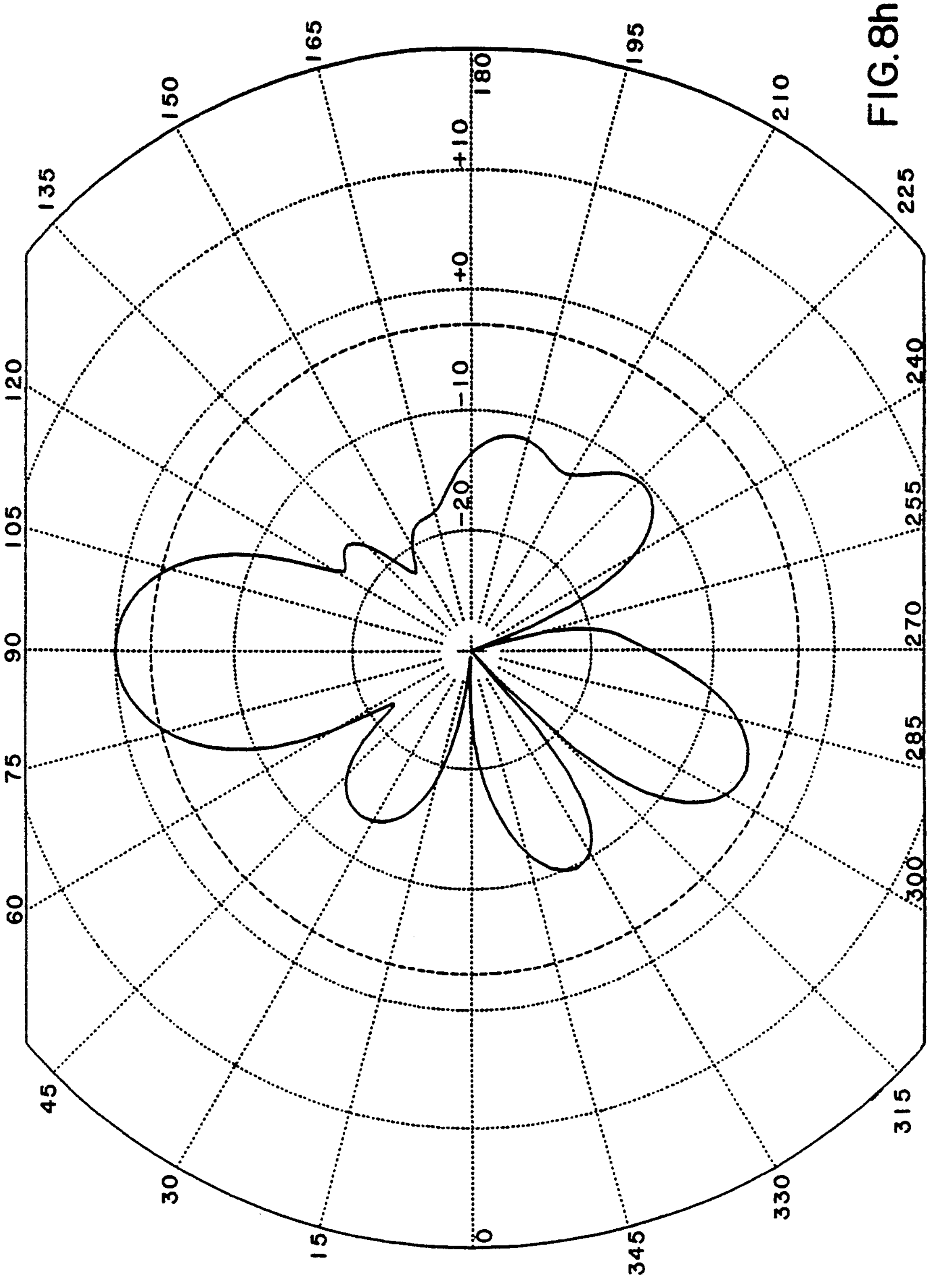
Figure 8I:
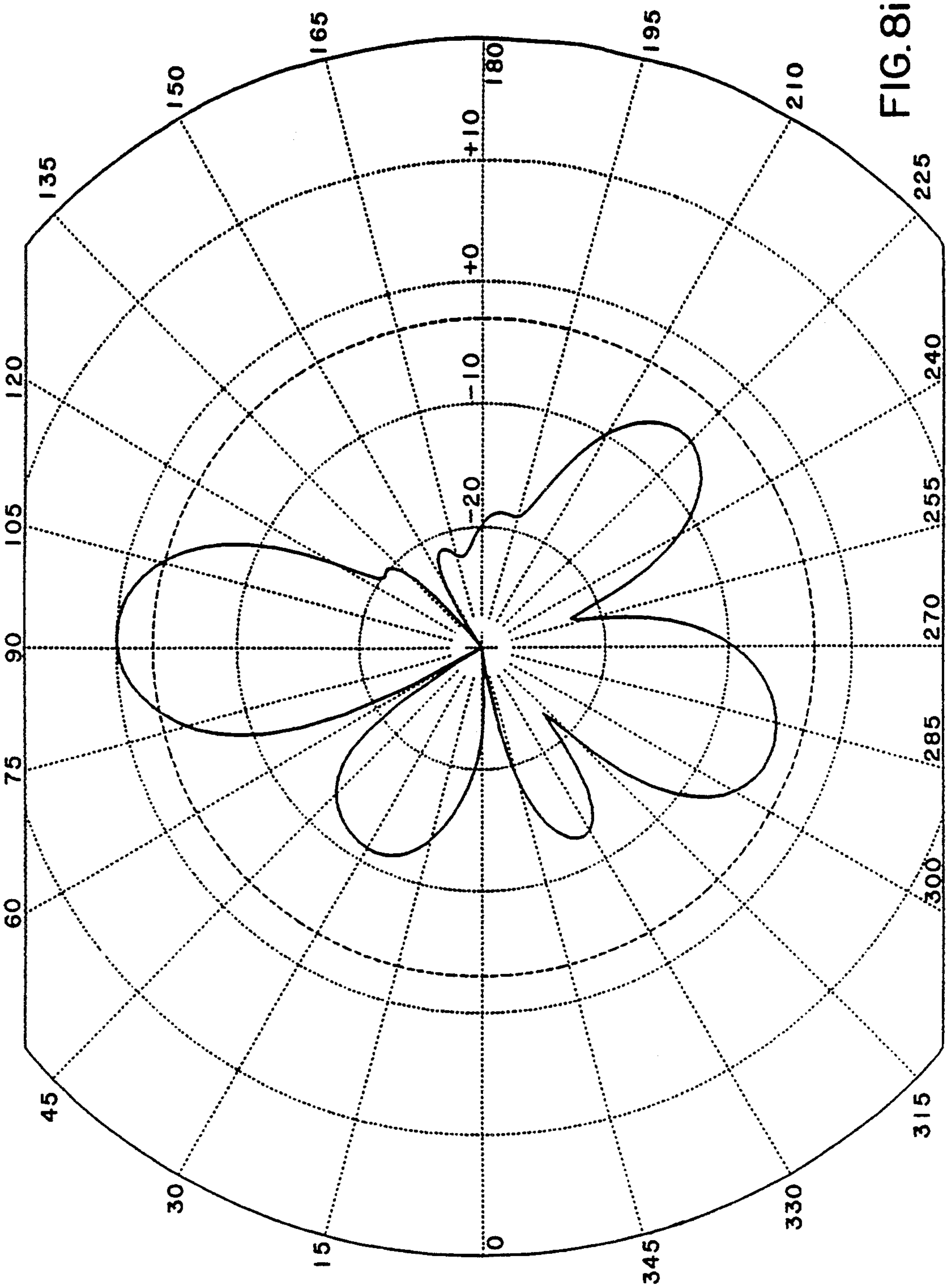
Figure 9A:
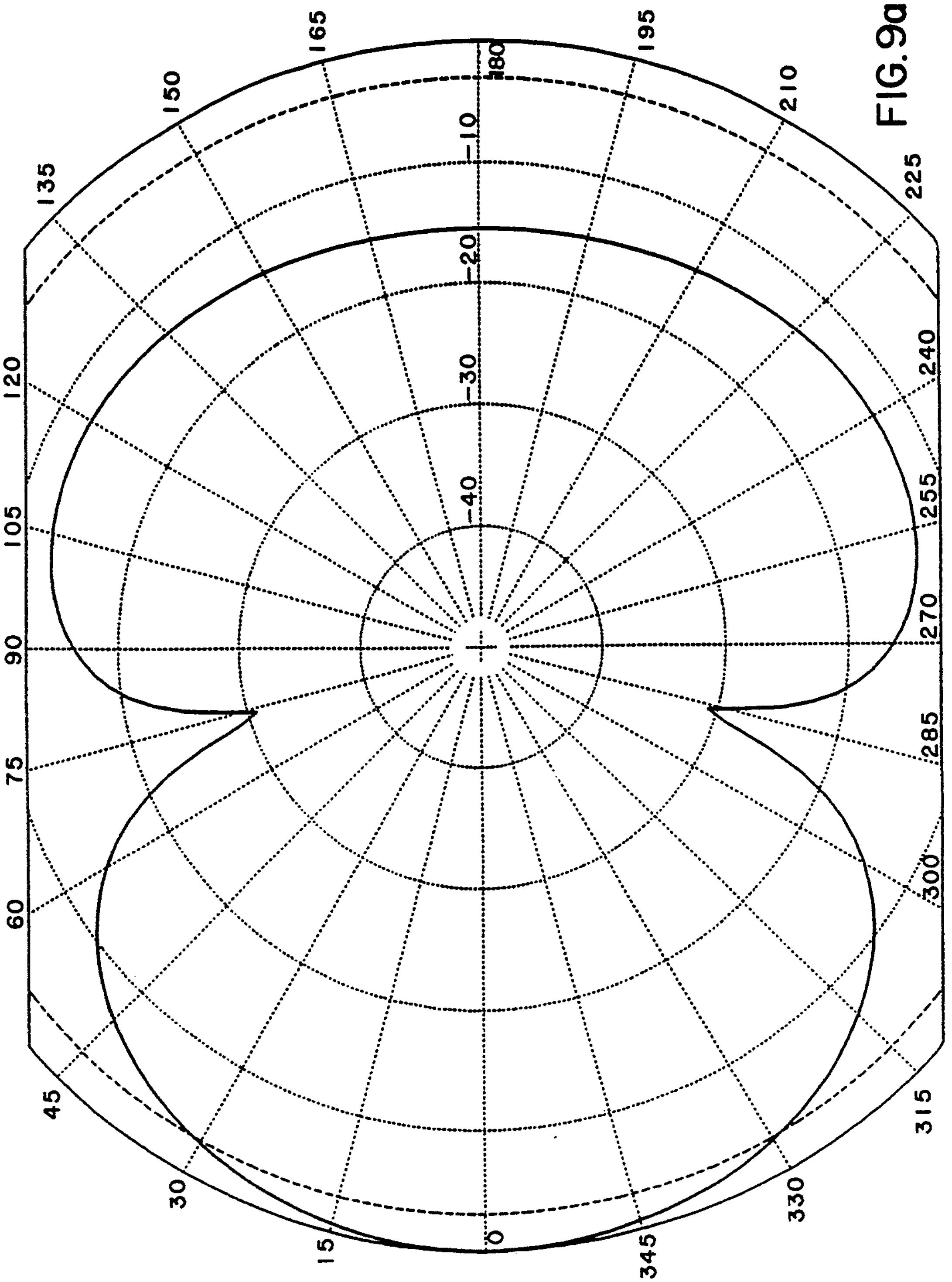
Figure 9B:
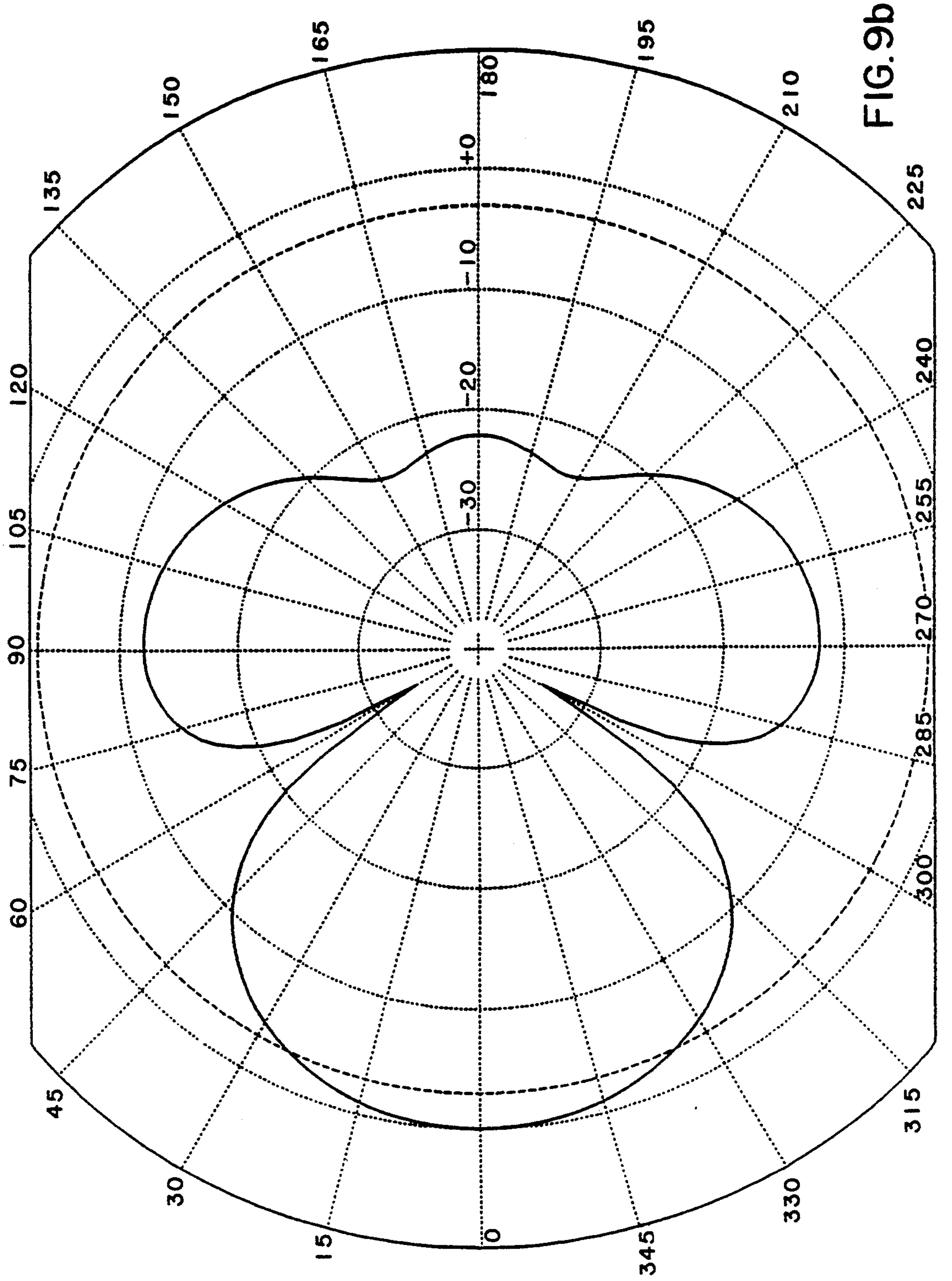
Figure 9C:
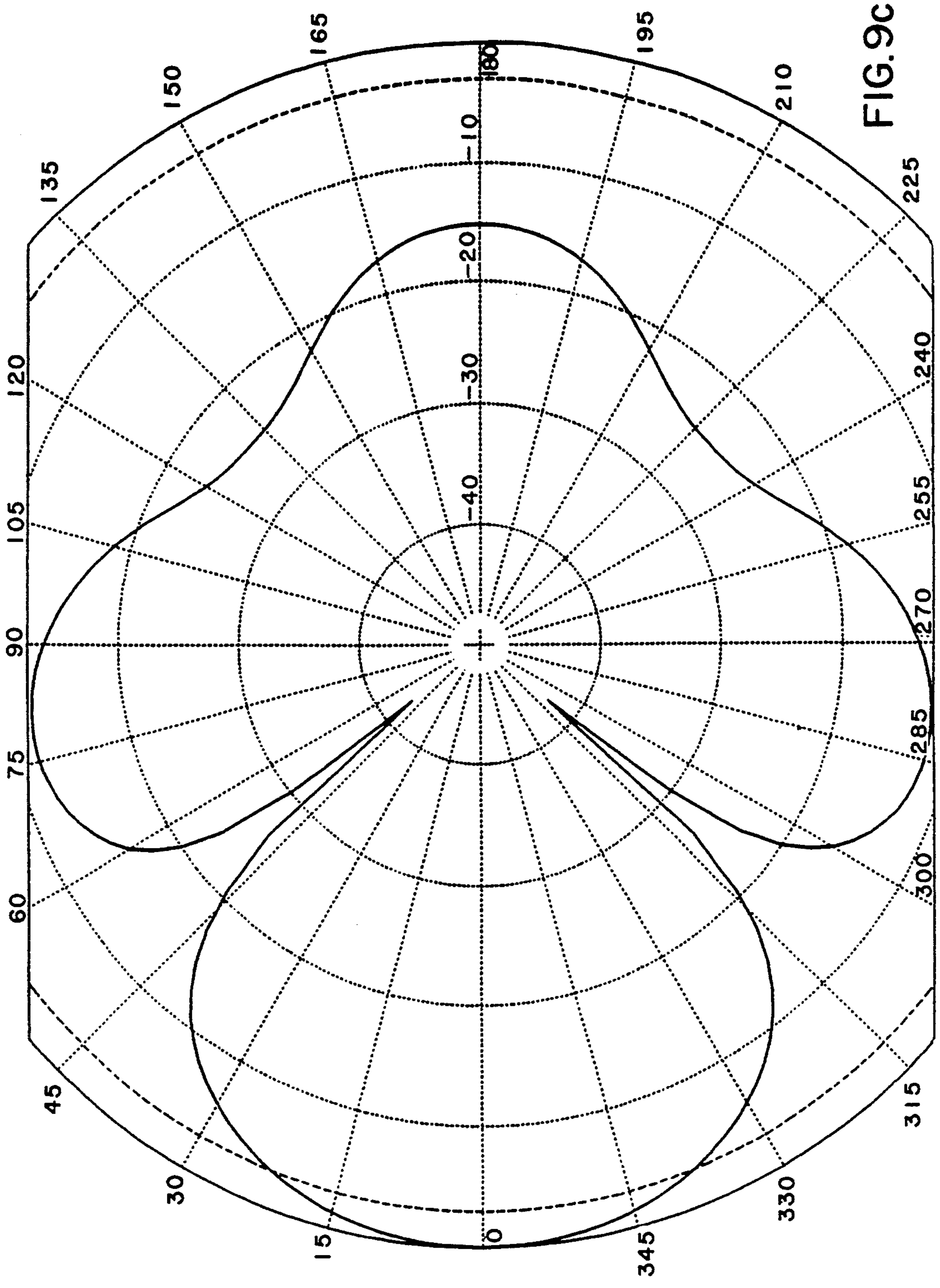
Figure 9D:
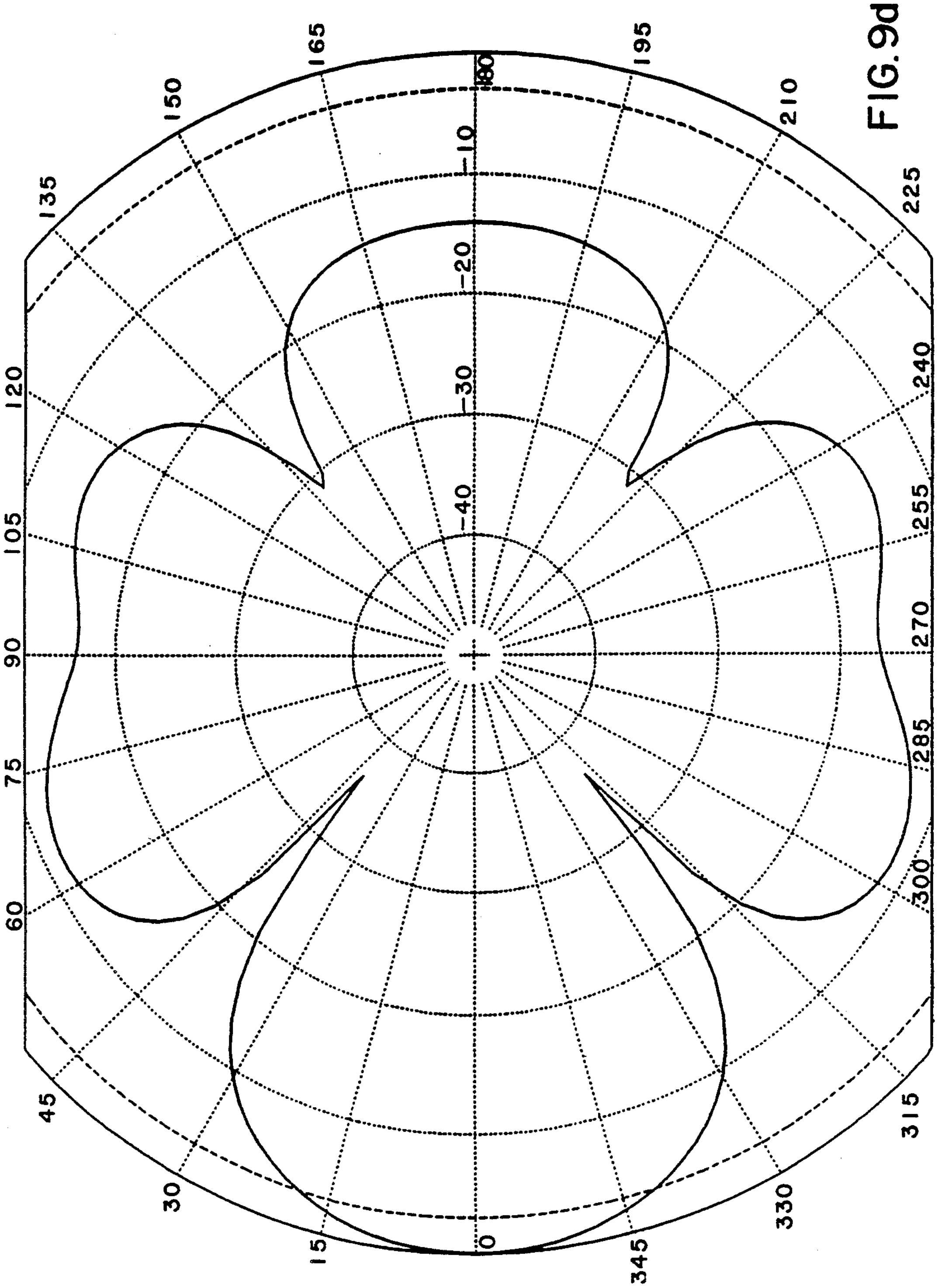
Figure 9E:
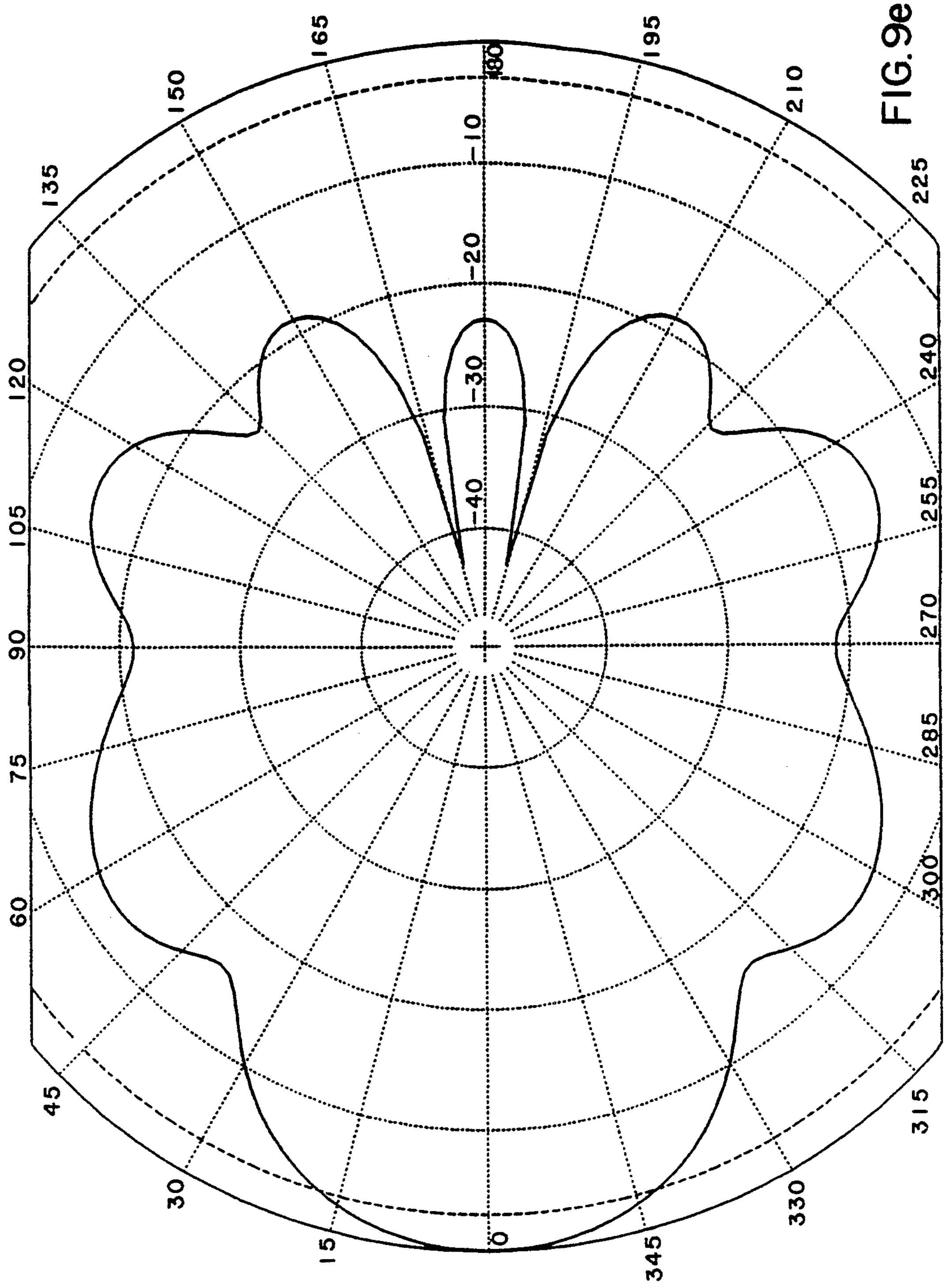
Figure 9F:
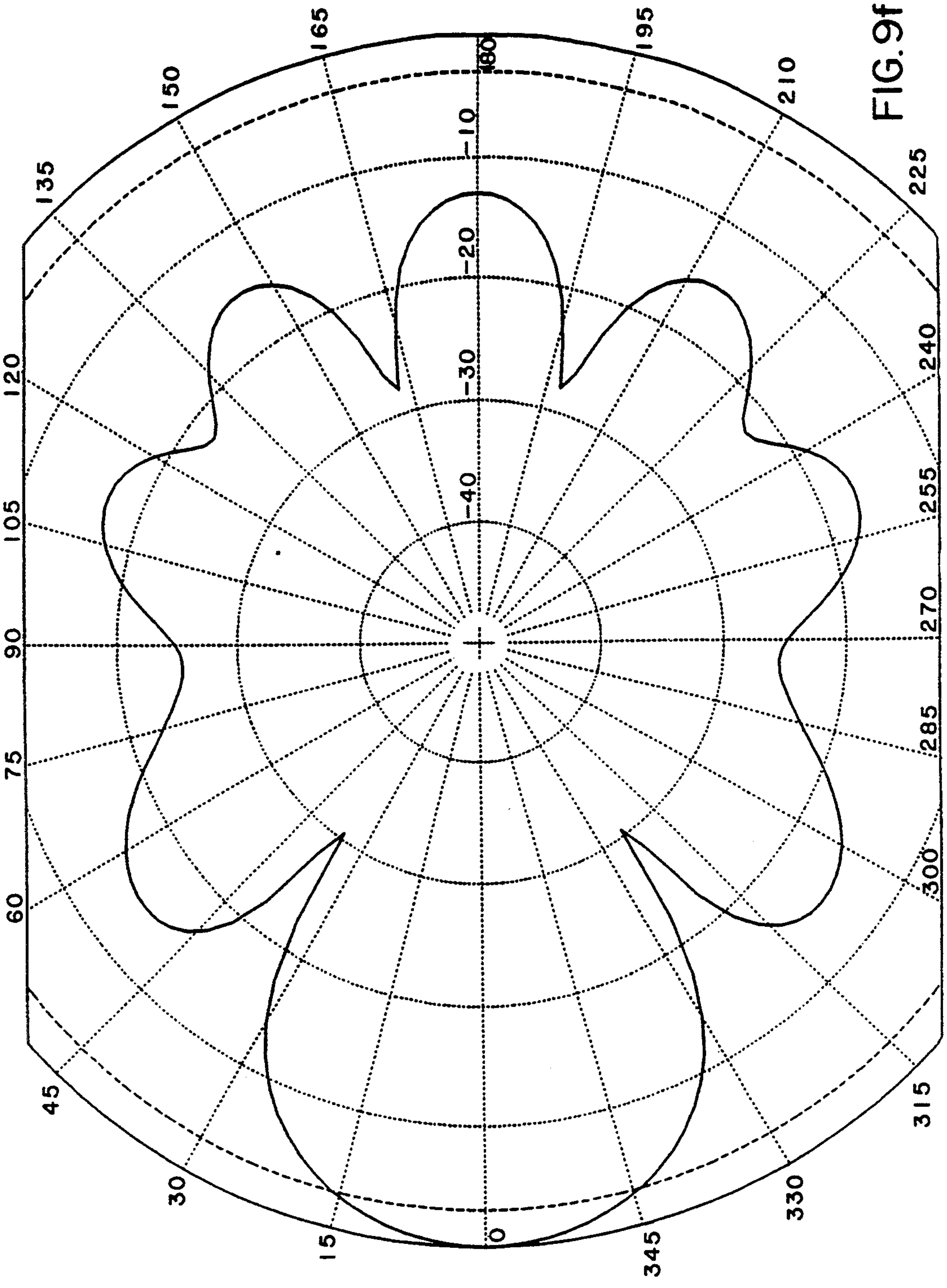
Figure 9G:
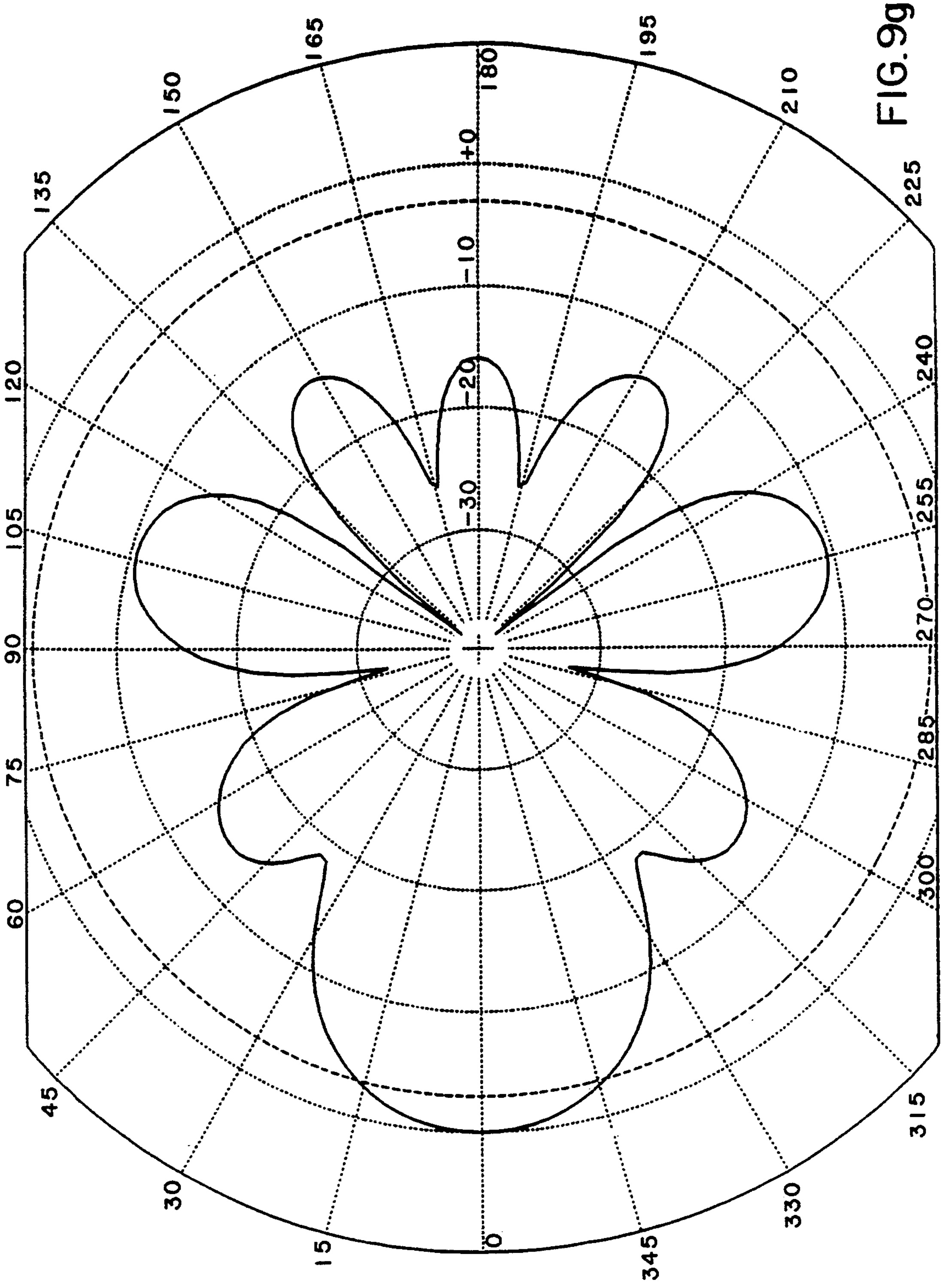
Figure 9H:
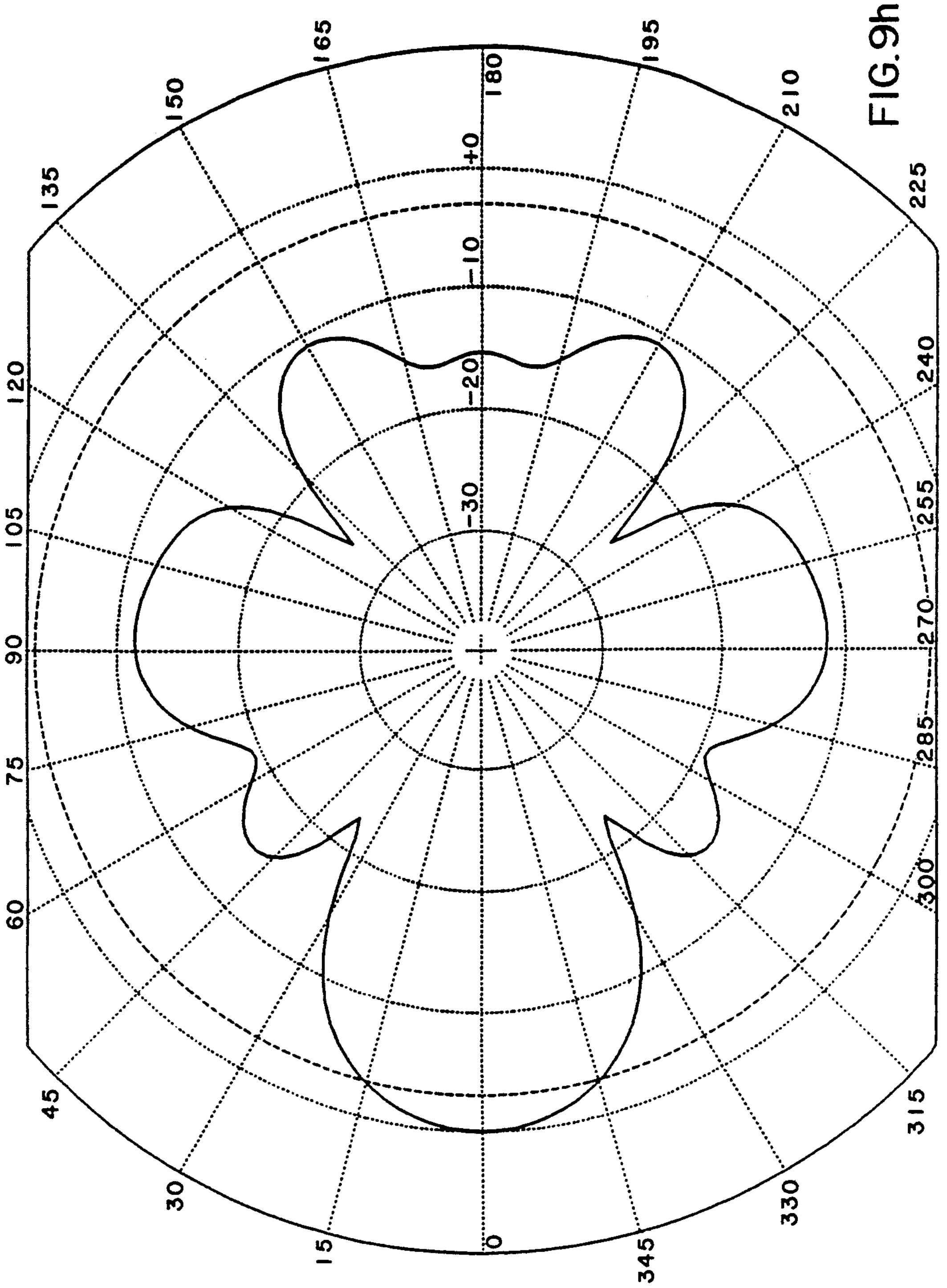
Figure 9I:
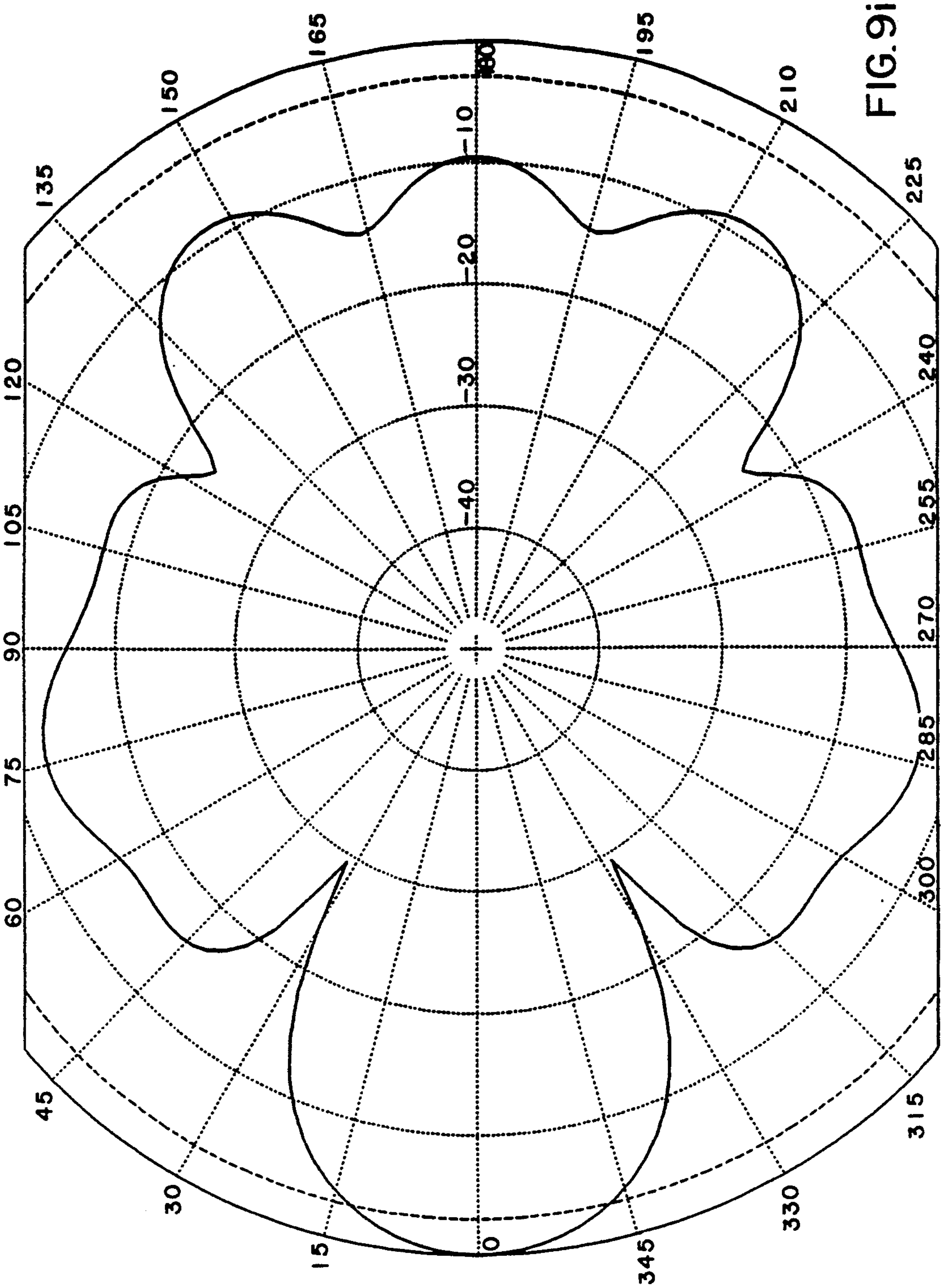

FIG. 7*b* illustrates a three-dimensional coordinate system defining the direction of line of propagation 710 of FIG. 7*a* in terms of azimuthal angle $\phi_S$ and zenith angle $\theta_S$.

As an example, for the icosahedral array of FIG. 1 with the dimensions indicated in TABLE I, steering in direction $\phi_S=30°$, $\theta_S=120°$, the delays required in the channels corresponding to delay elements 514 of FIG. 5 are

TABLE II

| ELEMENT # | DELAY* (MICROSECONDS) |
|---|---|
| 1 | −47.11 |
| 2 | −84.29 |
| 3 | −75.33 |
| 4 | −5.90 |
| 5 | +8.61 |
| 6 | +51.52 |
| 7 | −51.52 |
| 8 | −8.61 |
| 9 | +5.90 |
| 10 | +75.33 |
| 11 | +84.29 |
| 12 | +47.72 |

where the minus sign (−) represents a negative delay relative to the reference wavefront.

FIGS. 8*a*, 8*b*, 8*c*, 8*d*, 8*e*, 8*f*, 8*g*, 8*h*, and 8*i* are computer modeled plots in dB of the dodecahedral transducer array pattern at $\phi=\phi_S$ (a "vertical" pattern) at 2750, 3250, 3750, 4250, 4750, 5250, 5750, 6250, and 6750 Hz, respectively, with the delays set for generating a beam at $\phi_S=0°$, $\theta_S=90°$, in the absence of a surrounding icosahedral array. The "S" subscripts associated with $\phi_S$, and $\theta_S$ represent fixed steering angles. The dash-line circle on each plot represents 3 dB below the main beam peak amplitude. The frequency corresponding to the center of the octave band is 4750 Hz., at which frequency the interelement spacing, as described above, is approximately $\lambda/2$. The directional beam peak at $\theta=90^\circ$ is clear. Similarly, FIGS. 9*a*, 9*b*, 9*c*, 9*d*, 9*e*, 9*f*, 9*g*, 9*h*, and 9*i* are plots in dB of the dodecahedral transducer array pattern at $\theta=\theta_S$ (a "horizontal" pattern) at 2750, 3250, 3750, 4250, 4750, 5250, 5750, 6250, and 6750 Hz, respectively, with the delays set for generating a beam at $\phi_S=0^\circ$, $\theta_S=90^\circ$. The beam peaks at $\phi=0^\circ$ are clear.

Computer model plots of a nested array system similar to that of FIG. 6*b* were made. FIG. 10*a* is a "vertical" plot at $\theta=0^\circ$, which represents the beam formed by the inner dodecahedral array at 3750 Hz, with phasing set to produce a beam at $\phi_S=0^\circ$, $\theta_S=90^\circ$, in the presence of an unpowered icosahedral surrounding array. FIG. 10*a* may be compared with FIG. 8*c*, which has no surrounding array. While details of the sidelobe pattern are different, the main beams are similar. FIG. 10*b* is a "vertical" plot of $\theta=0^\circ$, which represents the beam formed by the outer icosahedral array near midband at 2500 Hz, with phasing set to produce a beam at $\phi_S=0^\circ$, $\theta_S=90^\circ$, in the presence of an unpowered included dodecahedral array.

Other embodiments of the invention will be apparent to those skilled in the art. For example, delays 514 of FIG. 5 may follow their respective power amplifiers 516 in the signal path, or they may be located between each switch 518 and the associated transponder 210, which is particularly advantageous, because the same delay can then be used for both transmission and reception to for similar beam patterns. While the two interspersed arrays can have completely different transmitters and receivers, a common receiver and display may be used, and switched between the arrays, since an operator may only be able to give attention to one display at a time. While two nested or interspersed arrays are described, other geometric figures may be chosen, and dimensions selected, to allow nesting of three or more transducer arrays. Also, the dodecahedral array may have its elements located at the centroid of the faces of the icosahedral array, or the dodecahedral array might even have a greater diameter than the icosahedral array with which it is nested, because the shadowing caused by the outermost elements would be minimal, as a result of the small subtended angle of the transducers of the outermost array as seen from the inner array.

What is claimed is:

1. A transducer array comprising:

a plurality of acoustic transducers for use in a fluid medium, each of said transducers having maximum lateral dimensions less than one acoustic wavelength in said medium;

arraying means for arraying said acoustic transducers at the vertices of a regular polyhedron defining vertices and more than six sides; and wherein said arraying means further comprises:

one of drive and receiving means for generating transducer drive signals and for receiving transduced signals therefrom, respectively; and delay control means coupled with said acoustic transducers and with said one of said drive means and said receiving means, for controlling an acoustic beam formed by said array.

2. An array according to claim 1, wherein said delay control means comprises delay lines.

3. An array according to claim 1, further comprising a second plurality of said acoustic transducers; and second arraying means for arraying said second plurality of acoustic transducers at the vertices of a second polyhedron to thereby form a second transducer array, and for locating said second transducer array concentric with said first transducer array.

4. An array according to claim 3, wherein said second polyhedron has a different number of faces than said first-named polyhedron.

5. An array according to claim 3, further comprising one of second drive means and second receiving means for generating transducer drive signals and for receiving transduced signals, respectively; and second delay control means coupled with said with said acoustic transducers of said second transducer array and with said one of said second drive means and said second receiving means, for controlling an acoustic beam formed by said second transducer array.

6. An array according to claim 3, wherein said first-mentioned polyhedron is an icosahedron, and said second polyhedron is a dodecahedron.

7. An array according to claim 3, wherein the diameter of said second array is selected to provide an interelement spacing in the range of $\frac{1}{3}$ to $\frac{2}{3}$ wavelength.

8. An array according to claim 6, wherein:

said polyhedron associated with said first array is larger than said polyhedron associated with said second array, whereby said second array is contained within the volume of said first array; and wherein:

said drive means associated with said first array operates at a frequency lower than said second drive means associated with said second array.

9. An array according to claim 2, wherein said first-named polyhedron is one of an icosahedron and a dodecahedron, and said second polyhedron is the other one of an icosahedron and a dodecahedron.

* * * * *

UNITED STATES PATENT AND TRADEMARK OFFICE

CERTIFICATE OF CORRECTION

PATENT NO. : 5,377,166

DATED : December 27, 1994

INVENTOR(S) : Philip M. Kuhn

It is certified that error appears in the above-indentified patent and that said Letters Patent is hereby corrected as shown below:

Column 2, line 36, "abovementioned" should read --above-mentioned--.

Column 3, line 35, "andor" should read --and/or--; line 61, after "array," insert --and--.

Column 5, line 47, after "514b" insert a comma --,--; line 55, after "therein" insert a comma --,--.

Column 9, line 35, delete "to".

Column 10, line 31, delete "with said"; line 52, delete "claim 2" and insert --claim 3--.

Signed and Sealed this

Twelfth Day of December, 1995

*Attest:*

BRUCE LEHMAN

*Attesting Officer*

*Commissioner of Patents and Trademarks*